United States Patent [19]
Morrow et al.

[11] Patent Number: 5,325,458
[45] Date of Patent: Jun. 28, 1994

[54] MONOLITHIC HOLLOW WAVEGUIDE AND METHOD AND APPARATUS FOR MAKING THE SAME

[75] Inventors: Clifford E. Morrow, N. Kingstown; Otto Gregory; Wakefield; Poonam Bhardwaj, Kingstown; Gong-En Gu, Cranston; Mary B. Bauman, N. Kingstown, all of R.I.

[73] Assignee: Surgilase, Inc., Warwick, R.I.

[21] Appl. No.: 832,708

[22] Filed: Feb. 7, 1992

[51] Int. Cl.⁵ .............................................. G02B 6/20
[52] U.S. Cl. .................................. 385/125; 385/123; 385/124
[58] Field of Search ............... 385/125, 141, 123, 124, 385/126, 142, 143, 144

[56] References Cited
U.S. PATENT DOCUMENTS

| 4,009,382 | 2/1977 | Nath | 240/1 |
| 4,453,803 | 6/1984 | Hidaka et al. | 350/96.32 |
| 4,463,319 | 7/1984 | Suzuki | 333/239 |
| 4,652,083 | 3/1987 | Laakmann | 350/96.32 |
| 4,688,892 | 8/1987 | Laakmann | 350/96.32 |
| 4,688,893 | 8/1987 | Laakmann | 350/96.32 |
| 4,805,987 | 2/1989 | Laakmann et al. | 350/96.32 |
| 4,806,289 | 2/1989 | Laursen et al. | 264/1.50 |
| 4,820,008 | 4/1989 | Malvern | 385/125 |
| 4,913,505 | 4/1990 | Levy | 350/96.10 |
| 4,917,830 | 4/1990 | Harrington et al. | 606/15 |
| 4,918,411 | 4/1990 | Staehlin et al. | 333/239 |
| 4,930,863 | 6/1990 | Croitoriu et al. | 350/96.32 |
| 4,932,749 | 6/1990 | Haidle et al. | 385/125 |
| 4,947,540 | 8/1990 | Komachi | 29/600 |
| 5,005,944 | 4/1991 | Laakmann et al. | 385/125 |

Primary Examiner—John D. Lee
Assistant Examiner—Phan T. Heartney
Attorney, Agent, or Firm—Kenyon & Kenyon

[57] ABSTRACT

The present application discloses a method and apparatus for making a low cost and highly efficient hollow waveguide for transmitting electromagnetic radiation. The waveguide is made from a solid substrate monolithic hollow tube with a reflectivity enhancing dielectric film formed directly over the inner surface. The film can be formed by native chemical reactions, with the material of the monolithic, hollow tube. The present application also discloses a method of polishing and cleaning the inner surface of the hollow tube.

One of the problems identified with the hollow metallic waveguide has been the poor surface finish on the inner wall of the hollow tube which results from the processes used to fabricate the metallic tube into final form. The coated reflectivity enhancing dielectric films more or less duplicate the surface roughness in the as formed tube thus seriously affecting the performance of the waveguide especially at the shorter wavelengths. The interior surface of the as received metal tubes can be significantly improved by chemically polishing and cleaning the tube and thereby improving the transmission characteristic of the wave guides for both infrared and visible wavelengths.

29 Claims, 24 Drawing Sheets

MONOLITHIC HOLLOW WAVEGUIDE AND METHOD AND APPARATUS FOR MAKING THE SAME

FIELD OF THE INVENTION

This invention pertains to hollow waveguides for transmitting electromagnetic radiation for a laser, particularly for use in medical, industrial and military applications.

BACKGROUND OF THE INVENTION $CO_2$ lasers are now being extensively used in medical, industrial and military applications, and a variety of optical fibers and hollow flexible waveguides have been proposed as the transmission medium for these applications. However, only hollow waveguides have proven to be economically and commercially possible for transmitting a relatively high flux of $CO_2$ laser energy.

Although dielectric-coated hollow waveguides for transmitting electromagnetic waves have been studied since the 1950's, the fabrication method for dielectric coated hollow flexible waveguides at infrared $CO_2$ laser wavelengths was not reported until 1983. (M. Miyagi, et al., entitled "Fabrication of Germanium-coated Nickel Hollow Waveguides for Infrared Transmission", Appl. Phys. Lett., Vol. 43, No. 5, Sep. 1, 1983.) Since then, various versions of that waveguide have been suggested and made by other groups.

Hollow waveguides are now used more often to transmit laser light in medical and industrial applications. In particular, the transmission of laser light at very different wavelengths (10.6 $\mu$m and 0.6328 $\mu$m) is ideally suited for hollow waveguides. Rigid hollow waveguides made of hollow alumina ceramic tubes encased in a stainless steel jacket have been used extensively to transmit a $CO_2$ laser light in rigid endoscopic applications. (See U.S. Pat. No. 4,917,083, Apr. 17, 1990). These waveguides, however are limited in both length and power handling and can readily overheat or melt when the laser light is not properly launched into the waveguide. Also, ceramic tubes are not flexible due to their inherent lack of ductility, precluding their use in flexible waveguides.

Some types of known hollow metallic waveguides are not flexible enough and tend to overheat, limiting the maximum input power. Another plastic type of flexible hollow waveguide has a larger inside diameter and a lower power transmission efficiency.

The following U.S. Pat. Nos. disclose hollow waveguides and lightpipes for lasers: 4,652,083 to Laakmann on Mar. 24, 1987 for "Hollow Waveguide", 4,688,892 to Laakmann on Aug. 25, 1987 for "Hollow Waveguide Having Disparate Dielectric overcoating", 4,688,893 to Laakmann on Aug. 25, 1987 for "Hollow Waveguide Having Plural Layer Dielectric", 4,805,987 to Laakmann on Feb. 21, 1989 for "Hollow Waveguide Using A Low Refractive Index Inner Layer", 4,913,505 to Levy on Apr. 3, 1990, "Hollow Lightpipe and Method for Its Manufacture", 4,930 863 to Croitoriu et al. on Jun. 5, 1990 for "Hollow Fiber Waveguide And Method of Making Same", and 4,917,083 to Harrington et al. on Apr. 17, 1990 for "Delivery Arrangement for A Laser Medical System". These patents are hereby incorporated by reference.

SUMMARY OF THE INVENTION

None of the above referenced hollow waveguides are made by a method of an enhancing dielectric film formed directly over the interior surface of a solid substrate monolithic hollow tube.

One of the difficulties in making such a directly coated hollow waveguide is the limitation of the finish of the inner surface of the monolithic hollow tubes which results from the processes used to fabricate the tubes into their final form. The coated dielectric films more or less duplicate the surface roughness in the formed tube, thus seriously affecting the performance of the waveguide transmission especially at shorter wavelengths. It is therefore desirable to have a successful method to grow a film directly over the interior surface of a solid monolithic tube to make commercial, hollow flexible and rigid waveguides with a highly efficient power transmission for both infrared and visible lasers. The present invention provides such a low cost and highly efficient manufacturing method.

It is also therefore desirable to have a successful method to polish and clean the inner surface of the as-received monolithic hollow tube and thereby significantly improve the interior optical smoothness of the tube before forming a reflectivity enhancing dielectric film on the interior surface of the tube. The present invention provides such low cost and highly efficient chemical polishing and cleaning method and apparatus.

The present invention provides a low cost and highly efficient method to manufacture commercial, monolithic, hollow flexible and rigid waveguides for transmitting both infrared and visible laser radiations.

The present invention also provides an easy and simple method to manufacture low cost, commercial, monolithic, hollow flexible and rigid waveguides by a single layer dielectric film formed directly over the inner surface of solid substrate monolithic hollow tubes. The following metals are useful in making such tubes: silver, aluminum, gold, barium, chromium, copper, molybdenum, nickel, tin, tungsten, lead, zinc, iron and their alloys.

The present invention provides a method for growing a high reflectivity dielectric film directly over the inner surface of solid substrate monolithic hollow tubes with an optimum film thickness for both infrared and visible wavelengths.

The present invention further provides a method to obtain a high reflectivity dielectric film with an optimum film thickness for both infrared and visible laser wavelengths by a native chemical liquid, gas and/or vapor phase reaction between the material of a solid substrate monolithic hollow tube and the chemical reaction components, where the material of the tube becomes a component of the formed dielectric film.

The present invention provides a simple method for making low cost and highly efficient hollow flexible and rigid waveguides for transmitting both $CO_2$ laser and HeNe laser radiations, comprising a solid substrate monolithic hollow tube with a reflectivity enhancing dielectric film formed directly over the interior surface of the tube by a native chemical reaction. Preferred enhancing dielectric films provided by the present invention were chosen to be materials with a complex index of refractivity, where the real part $n_:$, the refraction index, is less than about 4.5 and the imaginary part $k_1$, the extinction coefficient, which relates to the absorption properties of the film, should be close to zero.

The present invention provides detail design results on optimum film thickness of metal halide and metal oxide formed inside the monolithic hollow waveguide for both $CO_2$ laser and HeNe laser wavelengths. The film thickness grown over the interior surface of a very small inside diameter monolithic tube can be controlled by a "weight gain" method.

According to the present invention, a dielectric film is formed over the inner surfaces of monolithic hollow tubes such that the coated tube is capable of transmitting light, for example, of $CO_2$ and HeNe light The cost of the method described herein is less than the cost for the prior art processes, but such waveguides will be superior to competing technologies such as solid fibers and other types of hollow waveguides, particularly when a visible light is transmitted through the waveguide.

The present invention provides a means of improving the interior optical smoothness of monolithic hollow metal tube by polishing and cleaning the interior to a mirror like finish. Thereafter, an appropriate dielectric thin film can then be formed directly over such interior of the metallic tube for efficient transmission of electromagnetic radiations such as $CO_2$ laser and HeNe laser lights, for example.

The present invention also provides a highly efficient non-contact chemical polishing method to reduce the interior surface roughness of the as-received monolithic hollow tube by a factor of 100 times.

The present invention further provides a highly efficient non-contact chemical cleaning method to clean the interior surface of the as-received monolithic hollow tube without any surface damage after the non contact chemical polishing reactions.

A preferred embodiment of the present invention provides a highly efficient polishing and cleaning method to improve the interior surface finish of the monolithic hollow silver tube by a factor of over 100 times.

In one embodiment of this invention, the monolithic hollow tubes are made from metal and metal alloy, such as silver and sterling silver. The preferred metals and metal alloys have a high thermal conductivity, excellent ductility and excellent optical characteristics (reflectivity in the visible spectrum). It is also preferred that any such metal or metal alloy be capable of reacting with a halogen to form a thin native metal halide film. More preferably, such films have a very uniform dielectric coating with good infrared properties and excellent adherence. Alternatively, metal oxide films can be created to provide a uniform dielectric coating. Any conventional oxidizing agent effective to form the corresponding metal oxide may be used.

Some applications, such as medical endoscopic applications, require a $CO_2$ gas purge down the center of the waveguide. This gas purge prevents fluids and debris from being pushed up the waveguide by the in-situ gas pressure. However $CO_2$ gas in a waveguide Causes thermal lensing and other transmission losses which result in a heating of the waveguide. However, bends, and in particular tight bends, produce local heating.

The waveguides of the present invention have unmeasurable transmission losses when used straight and are capable of being bent to a very small radii of curvature without significant losses in transmission. Furthermore, local heating due to tight bends, thermal lensing at high powers or coating damage is dissipated by the high thermal conductivity of the waveguides of the present invention. Thus, the present invention avoids dangerous local heating of the tube.

It is preferred in medical applications of the present invention that the dielectric coating be substantially insoluble in body fluids, saline or similar solutions.

The present invention provides a monolithic waveguide for transmitting electromagnetic radiation comprising: a solid monolithic hollow tube and a thin, native, dielectric film up to about 20 microns in thickness formed directly over an interior surface of the monolithic hollow tube wherein the film has a complex index of refractivity with a real part, $n_1$, less than about 4.5 and an imaginary part, $k_1$, substantially equal to zero. The dielectric film may be composed of a metal halide or metal oxide film and the tube may be composed of a material having a complex index of refractivity with a real part $n_2$ greater than about 2.0 and an imaginary part $k_2$ less than approximately 85. The waveguide may be for use in a surgical laser.

Alternatively, the waveguide of the present invention may be used in industrial applications where the light is conducted to the work through said waveguide rather then by conventional means such as mirrors or mounting the laser directly on a X-Y stage that positions the beam. Since the waveguide of the present invention is flexible, a light duty X-Y stage could be used to position the waveguide. In applications where a laser is being added to existing equipment, the waveguide of the present invention provides an easy way to make this addition. The energy directed by the waveguide can be used as an industrial power delivery device for cutting, soldering, heat treatment, marking and other processing steps. The waveguide of the present invention also provides a means for welding, cutting, soldering and combinations thereof that are inaccessible using conventional approaches.

The present invention may further provide a method of manufacturing a monolithic hollow waveguide for transmitting electromagnetic radiation, comprising: polishing and cleaning an interior surface of a monolithic hollow tube and forming dielectric thin films up to about 20 microns in thickness directly over the polished and cleaned interior surface of the monolithic hollow tube. The invention may further provide polishing and cleaning steps that may be one of the following: contact mechanical cleaning and polishing, non-contact chemical cleaning and polishing or a combination of chemical and mechanical cleaning and polishing.

DETAILED DESCRIPTION

Figure 1:
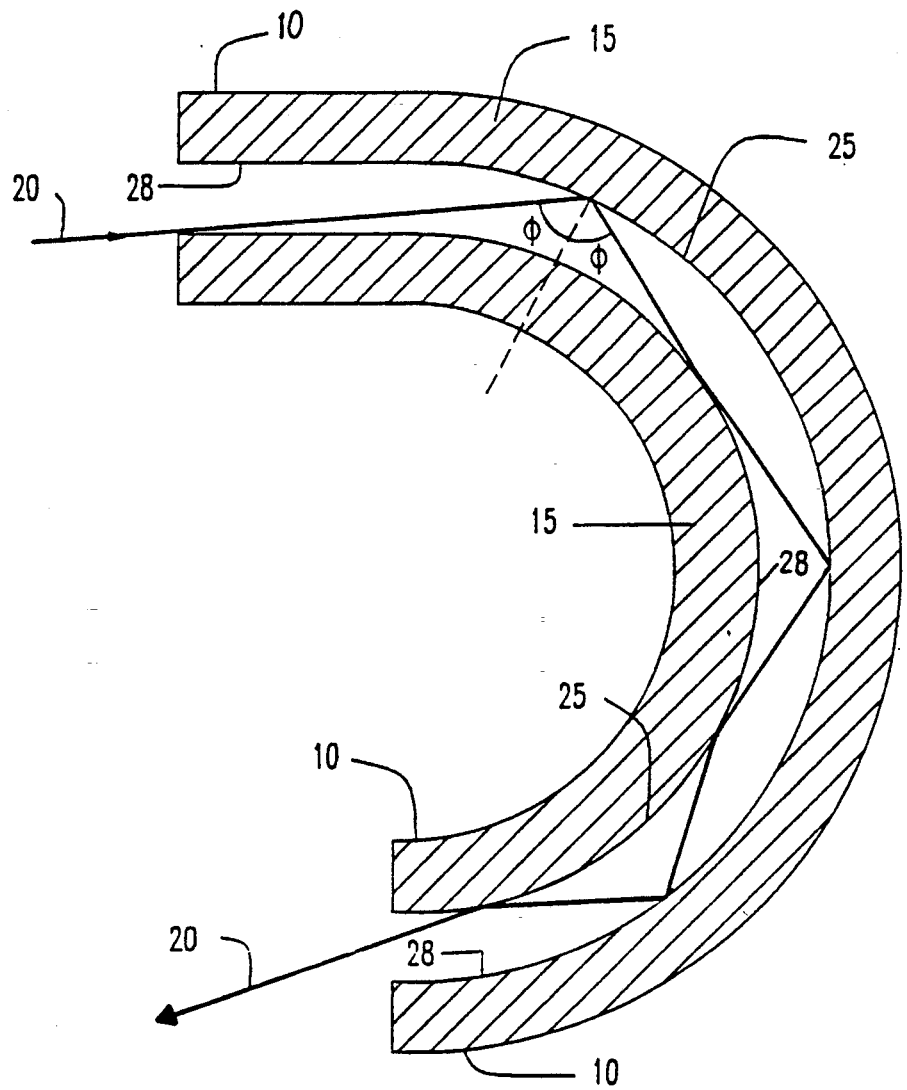
FIG. 1 is a diagrammatic representation of one form of the solid substrate monolithic hollow silver tube in accordance with the present invention.
Figure 2:
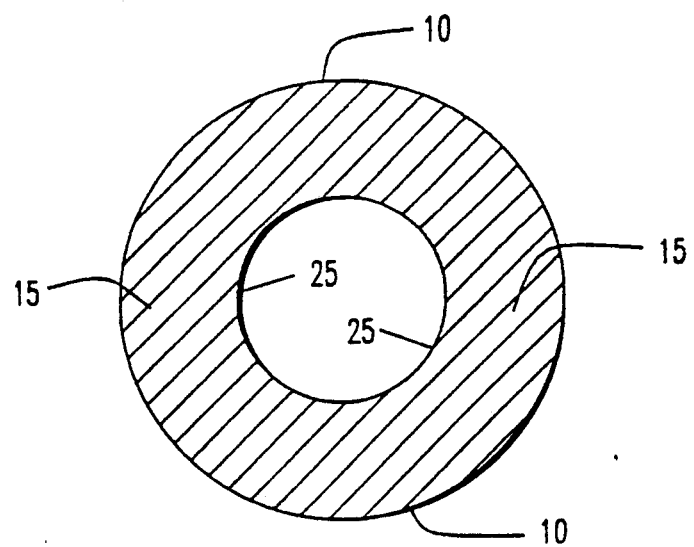
FIG. 2 is a diagrammatic representation of a transverse cross sectional view of the monolithic hollow tube of FIG. 1.

FIG. 1 is a diagrammatic representation of one form of the solid substrate monolithic hollow silver tube 10 made with a uniform material 15 and FIG. 2 is a transverse cross-sectional view of FIG. 1. The cross section may be of a variety of geometric configurations but is preferably either circular or rectangular. In one embodiment of the present invention, a monolithic hollow tube 10 is used to transmit electromagnetic radiation 20 at a certain wavelength provided the interior surface 25 of the tube 10 is highly smooth. For instance, a monolithic hollow silver tube with a substantially perfectly smooth inner surface will be an excellent hollow waveguide for transmitting HeNe laser light (at about 0.6 $\mu m$) with as high as over about 96% power transmission at a very low incident angle of $\phi$ equal to about 75°. However, such a monolithic hollow silver tube will not transmit $CO_2$ laser power (at about 10.6 $\mu m$) efficiently. The silver used for the monolithic hollow tube is about 99% pure and preferably commercial fine grade silver. The monolithic hollow tube of the present invention can also be made of one or more of the following metals: aluminum, gold, barium, chromium, copper, molybdenum, nickel, tin, tungsten, lead, zinc, iron and their alloys.

Figure 3:
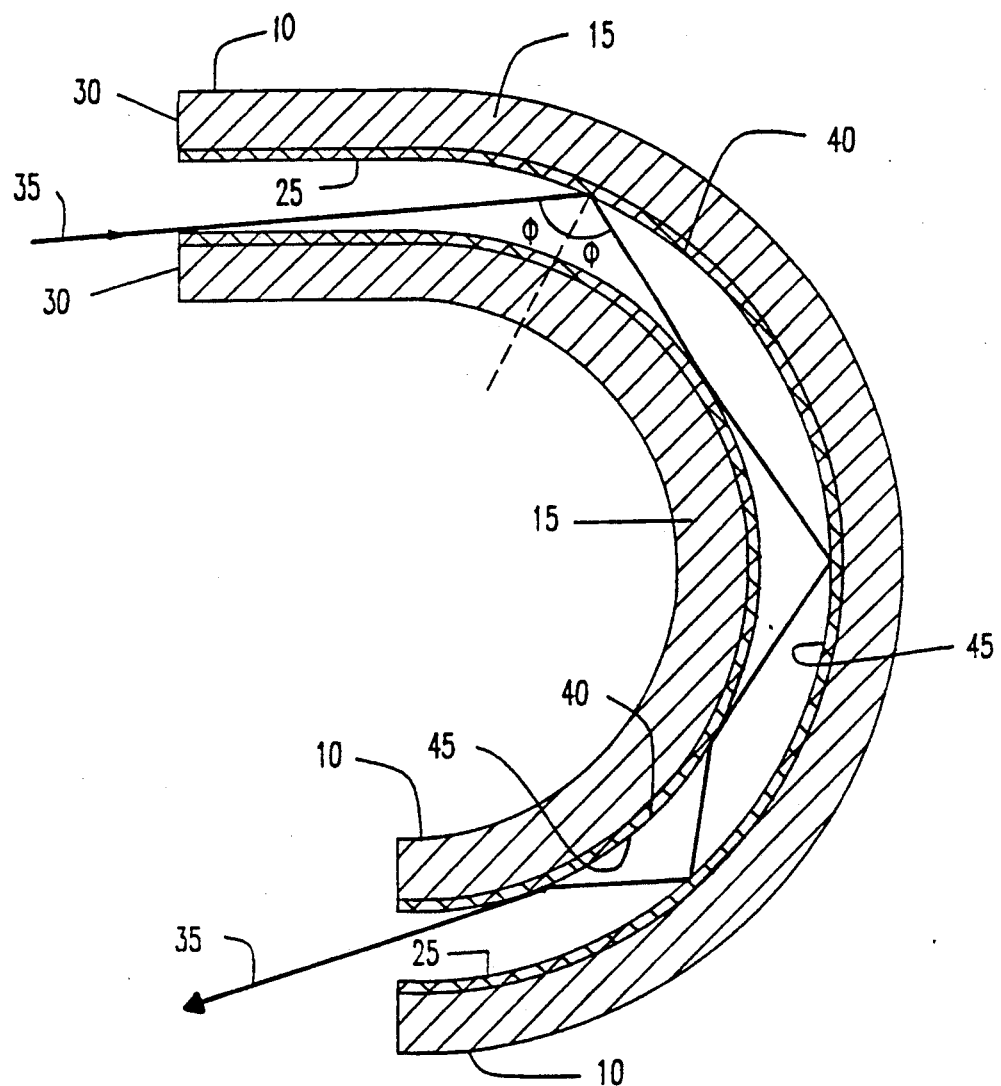
FIG. 3 is a diagrammatic representation of one form of a dielectric-coated solid monolithic hollow silver waveguide constructed in accordance with the present invention.
Figure 4:
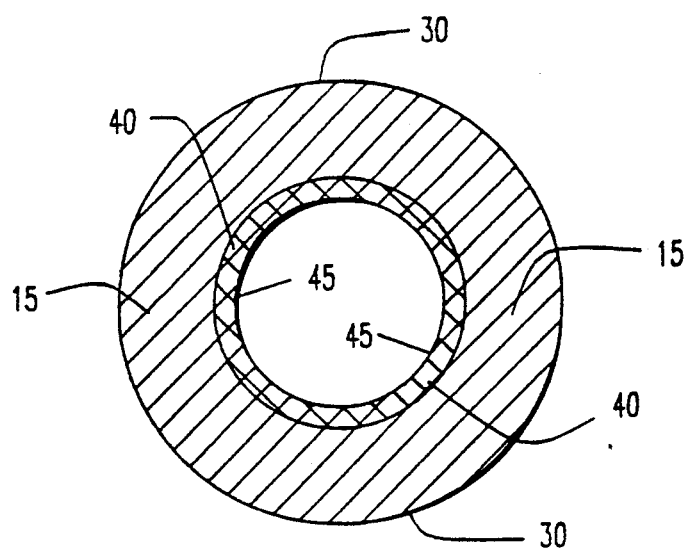
FIG. 4 is a diagrammatic representation of a transverse cross sectional view of the monolithic hollow silver waveguide of FIG. 3.

As shown in FIG. 3, one form of the reflectivity enhancing dielectric-coated solid substrate monolithic hollow silver waveguide 30 for transmitting electromagnetic radiation 35 at both visible and infrared wavelengths made according to the present invention. This monolithic hollow waveguide 30 has only a single solid substrate monolithic hollow silver tube 10 with a native reflectivity enhancing dielectric film 40 formed directly over the inner surface 25 of the hollow silver tube 10, in which the material 15 of the tube 10 also acts as one of the chemical reaction components to form the reflectivity enhancing dielectric film 40. FIG. 4 is a diagrammatic representation of a transverse cross-sectional view of the monolithic hollow silver waveguide of FIG. 3. Compared with existing hollow waveguides which all have multiple layer tubes and multiple layer coating films, the present invention is the most efficient and economical preferred approach.

As also shown in FIG. 3 and FIG. 4, before growing any reflectivity enhancing dielectric film 40 over the inner surface 25 of the as received monolithic hollow silver tube 10, the inner surface 25 may be polished and cleaned to improve the surface smoothness of the interior wall 28 of the hollow silver tube 10. Frequently the as-received monolithic hollow tube 10 as a result of the processes used to fabricate the monolithic tube 10, has a the poor surface finish on the interior wall 28. The formed reflectivity enhancing dielectric film 40 substantially duplicates the surface roughness of the monolithic hollow silver tube and may cause serious scattering losses. In particular, when a visible light transmits through a hollow waveguide 30, the scattering losses from the surface roughness may dominate any absorption losses from the film. In one embodiment of the present invention, the interior wall 28 of the as-received monolithic hollow silver tube 10 is polished and cleaned by a non-contact chemical method, or a contact mechanical method, such as tube brushes. This polishing and cleaning improves the laser power transmission characteristics of the monolithic hollow waveguide 30.

According to a preferred embodiment of the present invention, the interior surface finish of the tube can be improved to desired level by the non-contact chemical polishing and cleaning methods on the inner surfaces of the hollow silver tubes. A chemical polishing solution can be developed solely for this purpose for different materials.

A useful chemical polishing solution for a silver tube was prepared by dissolving 65 gms of $CrO_3$ in 100 ml of DI (deionized) water and adding 5 ml of pure HCl. This solution is a mixed acid solution.

Another preferred embodiment of the present invention uses a monolithic hollow silver tube as the solid substrate and halide elements as the chemically reacting components. Since the tube drawing process may lead to a very poor inner surface on the tubes that might effect the waveguides performance, it is preferred that the inner surface on which the film is grown is smooth and specular. Thus, polishing and cleaning of the silver tubes improves the inner surface finish. Thin film dielectric coatings are later formed on these surfaces to enhance the transmission of both the perpendicular (S) and parallel (P) polarizations of light bouncing down the interior surface. The performance of these waveguides is dependent on the inner surface finish of the monolithic hollow tube, the thickness of the thin film and the morphology of the film.

There are several halides which form on silver that have cubic crystal structures, making their properties isotropic instead of birefringent. The isotropic properties are important because birefringent crystal growth in the film can contribute to excess scatter of light depending on the crystal dimensions relative to the optical wavelength propagating in a waveguide. The metal halide films in general are very adherent and do not crack, flake or spall, even after repeated bending. Therefore, this approach is very well suited for making both flexible and rigid waveguides. Other types of films such as metal oxide films could also be deposited on the polished and cleaned inner surface of the monolithic hollow silver tubes.

Figure 5:
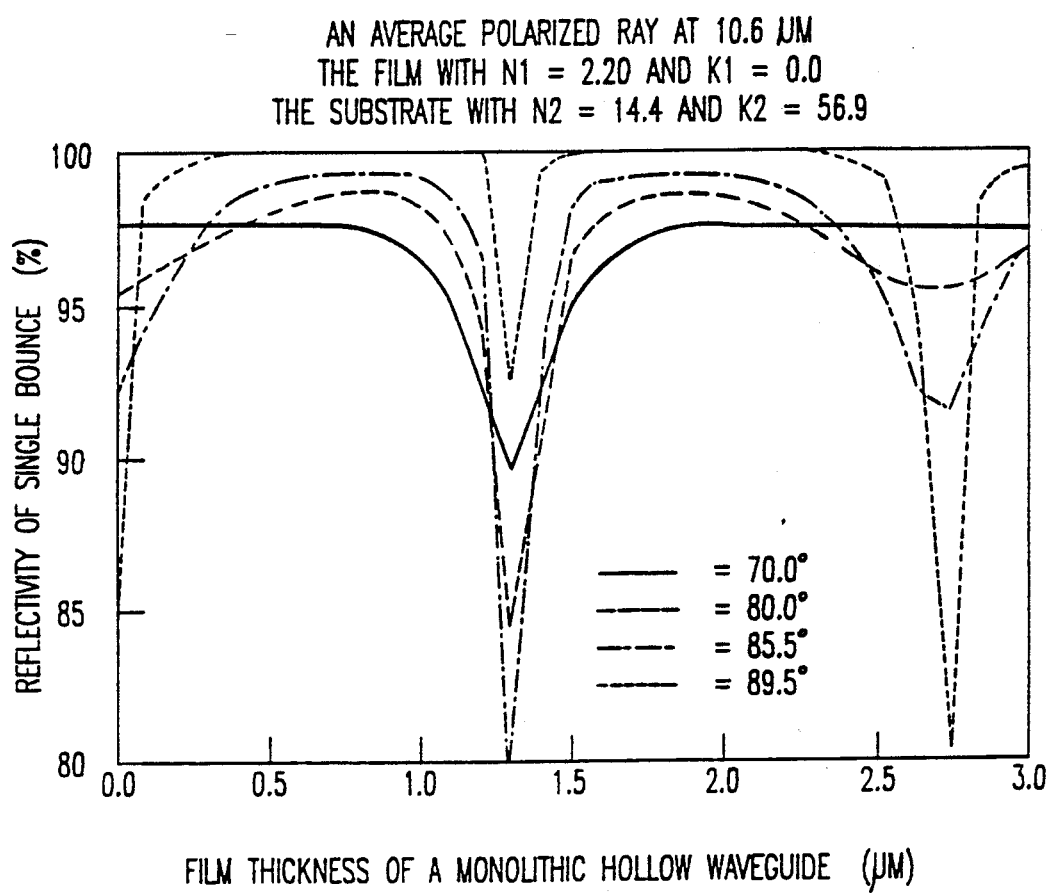
FIG. 5 is a graphic representation of a single bounce $CO_2$ laser power (10.6 $\mu$m) reflectivity as a function of thickness of the film formed over the inner surface of the tube in accordance with the present invention, where the film material has a complex index of refractivity with a real part $n_1=2.2$ and an imaginary part $k_1=0.0$, and the substrate material of the monolithic hollow tube has a complex index of refractivity with a real part $n_2=14.4$ and an imaginary part $k_2=56.9$.
Figure 6:
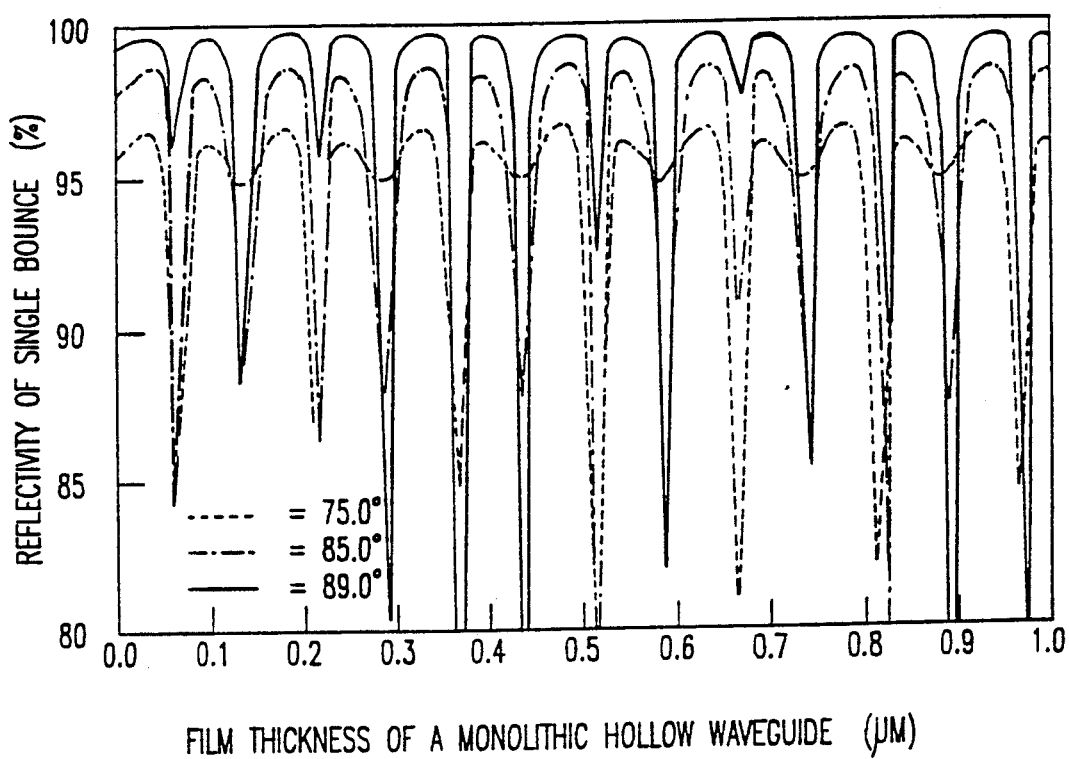
FIG. 6 is a graphic representation of a single bounce HeNe laser power (0.633 $\mu m$) reflectivity as a function of thickness of the film formed over the inner surface of the tube in accordance with the present invention, where the film material has a complex index of refractivity with a real part $n_1=2.2$ and an imaginary part $k_1=0.0$, the substrate material of the monolithic hollow tube has also a complex index of refractivity with a real part $n_2=14.4$ nd an imaginary part $k_2=56.9$.

Low cost monolithic hollow silver waveguides according to the present invention are particularly useful for transmission of laser lights with a combination of very different wavelengths, such as a combination of $CO_2$ laser (about 10.6 $\mu$m) and HeNe laser beams (about 0.6 $\mu$m) which are now being extensively used in surgical, industrial and military applications as well as other fields. To obtain an optimum waveguide film thickness for transmitting both about 10.6 $\mu$m and about 0.6 $\mu$m laser beams, an average polarized laser power transmission is calculated as a function of thickness of the film formed over the inner surface of the monolithic reflective metal such as silver tube at both about 10.6 $\mu$m and about 0.6 $\mu$m, where the film material has a complex index of refractivity with a real part $n_1$ = about 2.2 and an imaginary part $k_1$ = about 0, the substrate material of the monolithic hollow tube has also a complex index of refractivity with a real part $n_2$ = about 14.4 and an imaginary part $k_2$ = about 56.9, and the results are as shown in FIG. 5 and FIG. 6 respectively (these calculations model a silver halide film formed directly over the inner surface of a monolithic hollow silver substrate). The thickness of the film is related to its weight per unit of surface area. For example, in a silver tube with a 1 mm internal diameter, the increase in mass of the tube due to the formation of a silver bromide (AgBr) film is related to the thickness of the silver bromide by the following formula:

$$\text{Thickness in microns} = 11.56103 \frac{\text{Weight Change in mG}}{\text{Tube Length in cm}}$$

Low cost monolithic hollow waveguides with very high laser power transmitting efficiency for both $CO_2$ and HeNe laser wavelengths are made by controlling the thickness of the film formed over the interior surface of the monolithic hollow tube to within the "transmission windows" for the relevant wavelenghts. It is very difficult to measure the film thickness inside the monolithic tube, especially for tubes with a very small inside diameter. Most available thin film measuring instruments are designed only for a flat surface at a set of visible wavelengths. According to another preferred embodiment of the present invention, the film thickness inside a very small inner diameter hollow tube is successfully measured by a "weight gain" method and, thereby, the thickness of the film formed over the interior surface of the monolithic hollow tube can be controlled accurately at the "transmission windows" for more than one laser as shown in FIG. 5 and FIG. 6.

The "weight gain" measuring method may include the following steps: measuring the dimensions and weight of the monolithic hollow tube; measuring the dimensions and weight of the monolithic hollow tube after polishing and cleaning processes; and measuring the weight of the monolithic hollow tube after forming the reflectivity enhancing dielectric over the inner surface of the polished and cleaned monolithic hollow tube.

Figure 7:
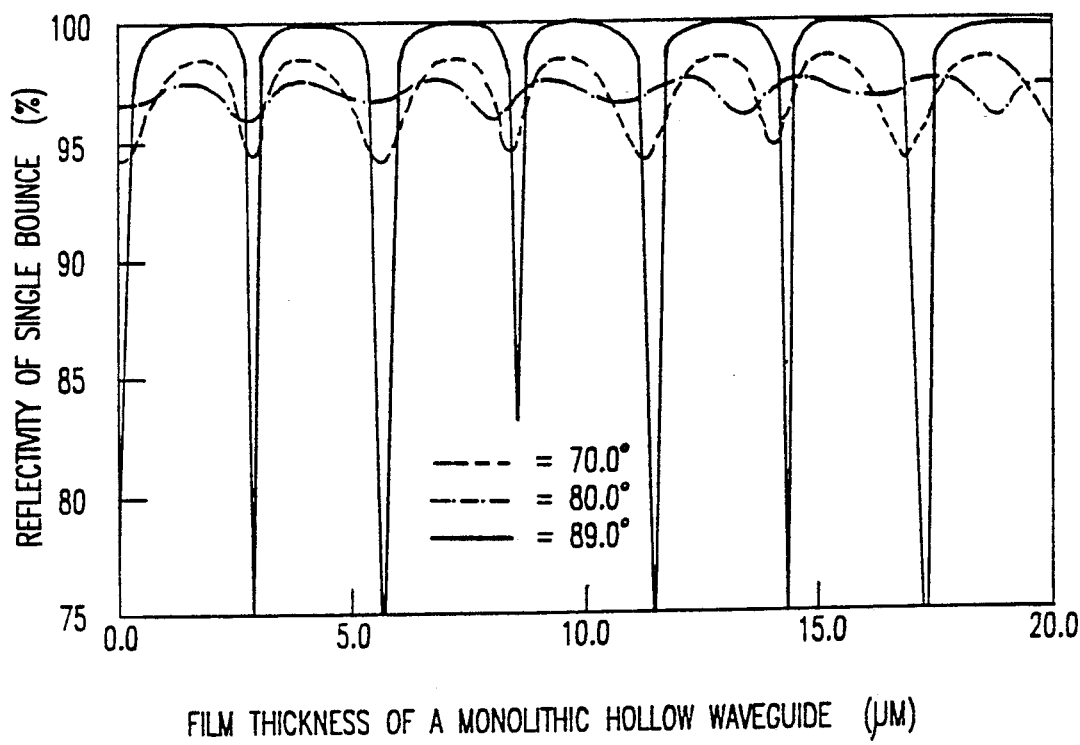
FIG. 7 is a graphic representation of a single bounce $CO_2$ laser power (10.6 $\mu m$) reflectivity as a function of thickness of the film formed over the inner surface of the tube in accordance with the present invention, where the film material has a complex index of refractivity with a real part $n_1=1.35$ and an imaginary part $k_1=0.0$, and the substrate material of the monolithic hollow tube has a complex index of refractivity with a real part $n_2=26.0$ and an imaginary part $k_2=67.3$.
Figure 8:
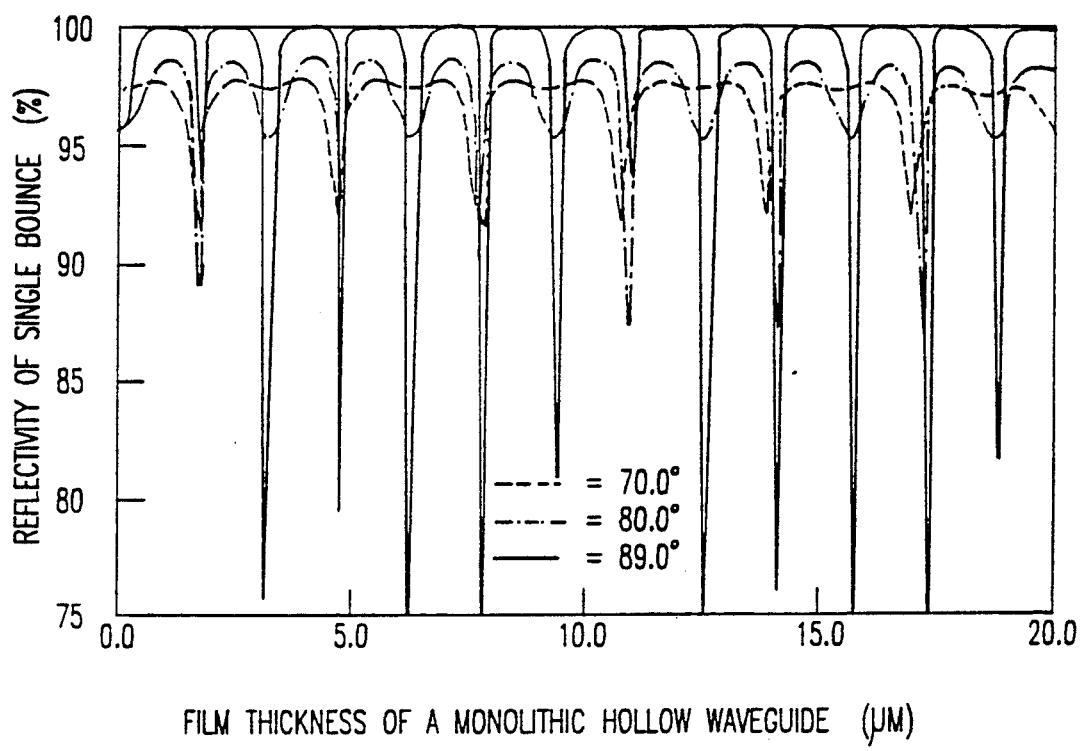
FIG. 8 is a graphic representation of a single bounce $CO_2$ laser power (10.6 $\mu m$) reflectivity as a function of thickness of the film formed over the inner surface of the tube in accordance with the present invention, where the film material has a complex index of refractivity with a real part $n_1=1.95$ and an imaginary part $k_1=0.0$, and the substrate material of the monolithic hollow tube has a complex index of refractivity with a real part $n_2=14.4$ and an imaginary part $k_2=56.9$.
Figure 9:
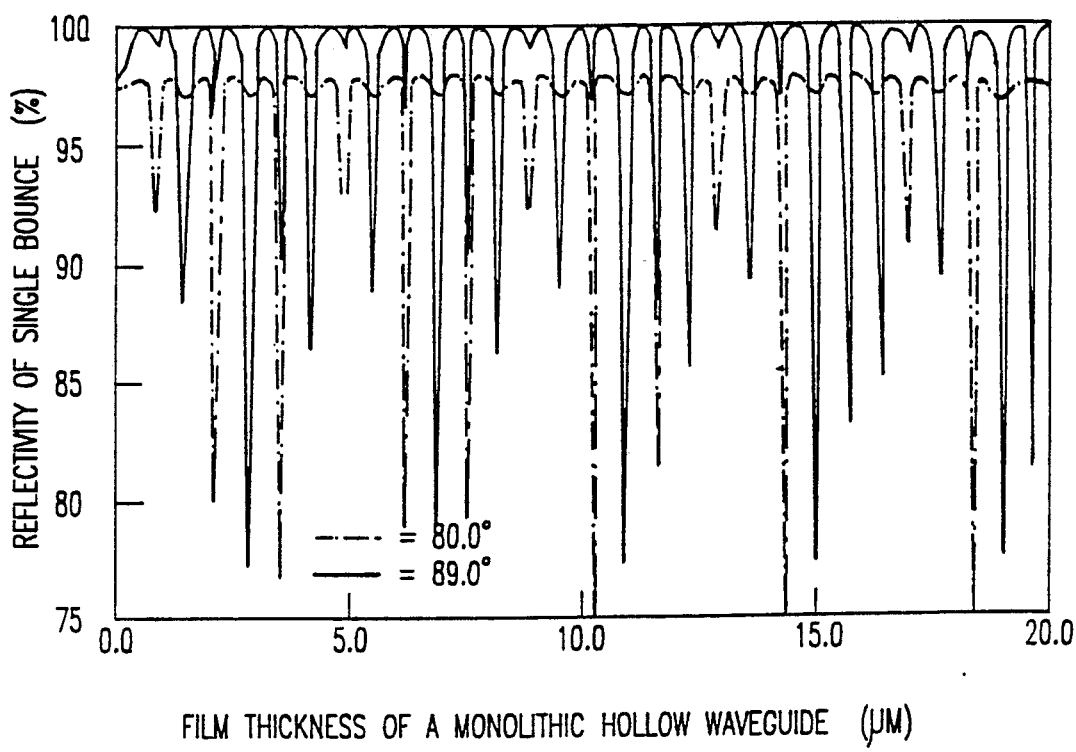
FIG. 9 is a graphic representation of a single bounce $CO_2$ laser power (10.6 $\mu m$) reflectivity as a function of thickness of the film formed over the inner surface of the tube in accordance with the present invention, where the film material has a complex index of refractivity with a real part $n_1=4.0$ and an imaginary part $k_1=0.0$, and the substrate material of the monolithic hollow tube has a complex index of refractivity with a real part $n_2=8.7$ and an imaginary part $k_2=58.2$.

FIG. 7, FIG. 8 and FIG. 9 are graphic representations of a single bounce $CO_2$ laser power (about 10.6 $\mu$m) reflectivity as a function of the thickness of the film formed over the inner surface of the monolithic hollow tube in accordance with the present invention for different film materials over different substrate materials of tubes. The results show that there are many "film thickness windows" within about 20 $\mu$m thickness of the film where a single bounce reflectivity of an average polarized $CO_2$ laser beam can be as high as about 97.5% at a very low incident angle of $\phi$ equal to about 70° measured from the normal, for a film having a complex index of refractivity with a real part $n_1$ less than about 4.5 and an imaginary part $k_1$ equal to about zero, over a substrate of the monolithic hollow tube having a complex index of refractivity with a real part $n_2$ greater than about 2.0 and an imaginary part $k_2$ less than approximately 85. In other words, the low cost and highly efficient monolithic hollow waveguide for transmitting electromagnetic radiations can be made by a reflectivity enhancing dielectric film having a complex index of refractivity with a real part n: less than about 4.5 and an imaginary part $k_1$ equal to about zero formed directly over the inner surface of different kind of solid substrate. Some monolithic hollow metal or metal alloy tubes which have optical properties similar to those of silver or silver alloys are listed in Table 1.

Figure 10:
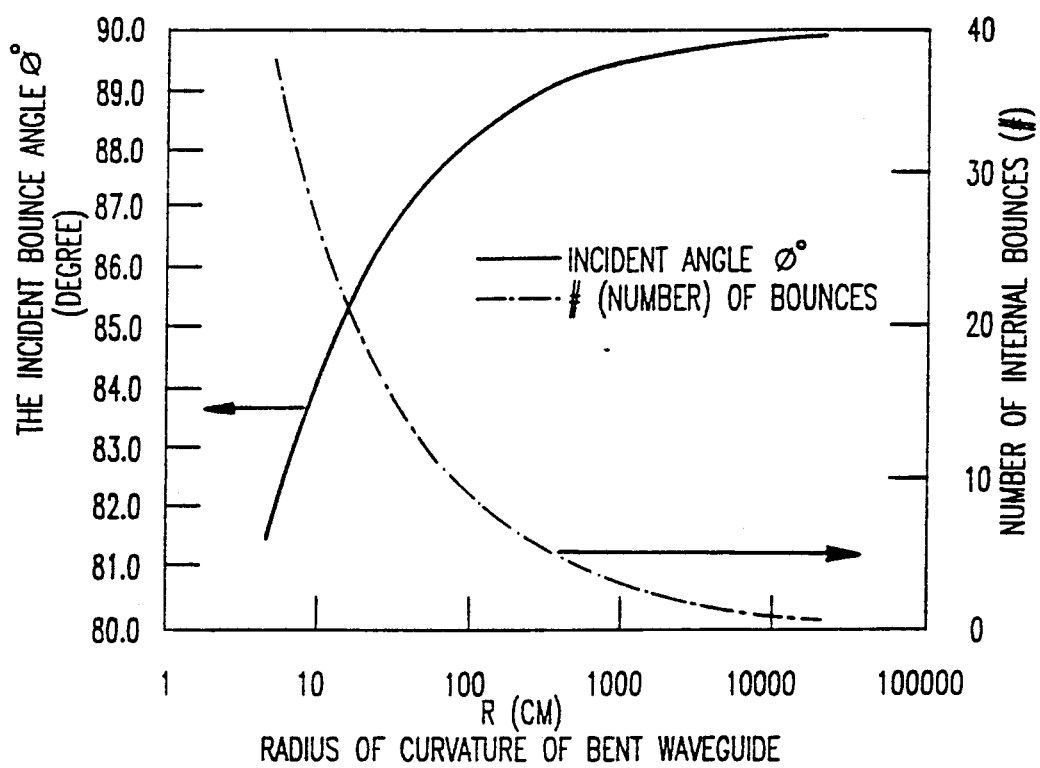
FIG. 10 is a graphic representation of the incident bounce angle ($\phi$) and the number of internal bounces as a function of the radius of curvature over a 50 cm long monolithic hollow bent silver waveguide with 1 mm inside diameter (ID) for a laser beam propagating in the direction of the guide axis.

FIG. 10 shows that the angle of incident ray ($\phi$) and the number of internal bounces as a function of the radius of curvature (R) over a half meter long monolithic hollow bent waveguide with 1 mm inside diameter (ID) for a laser beam traveling in the direction of the guide axis. Considering a waveguide having a 30 cm radius of bend over the half meter long monolithic hollow waveguide, the propagating light will have a total of about 15 internal bounces with an incident bounce angle of $\phi$ equal to about 86.7°.

TABLE 1

THE OPTICAL PROPERTIES OF THE MONOLITHIC HOLLOW TUBE MATERIALS AT 10.6 MICRON

| Material | n | k | Reference |
|---|---|---|---|
| Ag | 14.4 | 56.9 | 10 (A. J. Moses) |
| Al | 20.5 | 58.6 | 11 (K. Kudo, et al.) |
| Au | 17.1 | 55.9 | 11 (K. Kudo, et al.) |
| Cr | 11.8 | 25.9 | 12 (A. P. Lenham, et al.) |
| Cu | 14.1 | 64.3 | 11 (K. Kudo, et al.) |
| Fe | 9.63 | 28.5 | 12 (A. P. Lenham, et al.) |
| Ni | 9.08 | 34.8 | 12 (A. P. Lenham, et al.) |
| Sn | 17.4 | 43.5 | 11 (K. Kudo, et al.) |
| W | 10.7 | 31.0 | 12 (A. P. Lenham, et al.) |
| Zn | 15.8 | 48.7 | 11 (K. Kudo, et al.) |

The references listed in Table 1 are: A. J. Moses, "Optical Material Properties", *IFI/Plenum Data Corporation*, pp. 4-92, 1971; K. Kudo, "Tables of Fundamental Properties of Materials", *Kyoritsu Shuppan*, Tokyo Japan, 1972; and A. P. Lenham, et al., "Optical Constants of Transition Metals in the Infrared", *J. Opt. Soc. Amer.*, Vol. 5, pp. 1137-1138, 1966, and are hereby incorporated by reference.

Figure 11:
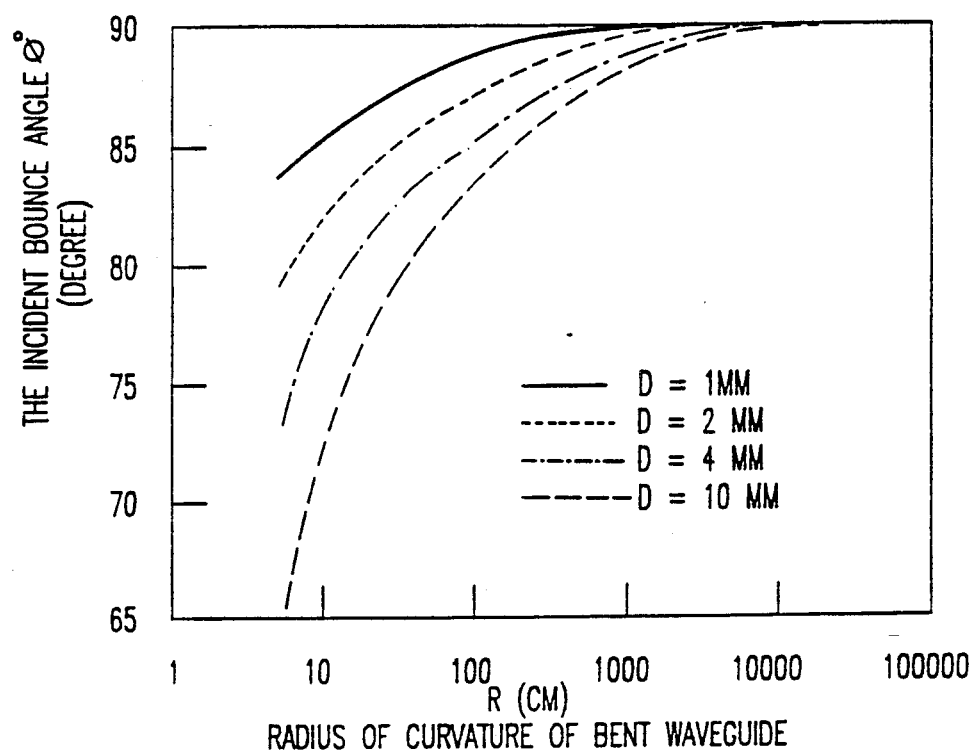
FIG. 11 is a graphic representation of the incident bounce angle ($\phi$) as a function of the radius of curvature over the 50 cm long monolithic hollow bent silver waveguides of varying inside diameters (IDs) for a laser beam propagating in the direction of the guide axis.
Figure 12:
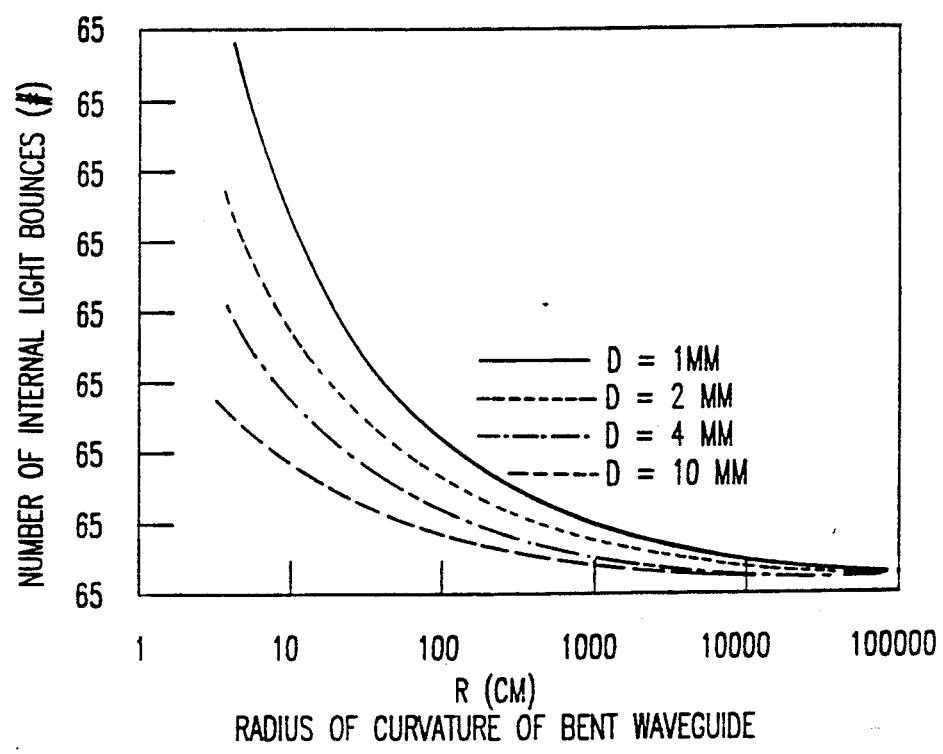
FIG. 12 is a graphic representation of the internal bounce as a function of the radius of curvature over the 50 cm long monolithic hollow bent waveguides of varying inside diameters (IDs) for a laser beam propagating in the direction of the guide axis.

Considering a laser light traveling in the direction of the guide axis inside a 50 cm long monolithic hollow bent waveguides of varying inside diameters (ID), the incident bounce angle ($\phi$) and the number of the internal bounces as functions of the radius of curvature (R) are as shown in FIG. 11 and FIG. 12 respectively. As the waveguide ID is increased, the number of internal bounces will decrease and the incident bounce angle ($\phi$) will increase. The ID of the monolithic hollow tube making up the waveguide can be less than about 5 mm and is preferably less than about 3 mm. A preferred embodiment of the present invention uses an inside diameter equal to about 1 mm.

Figure 13:
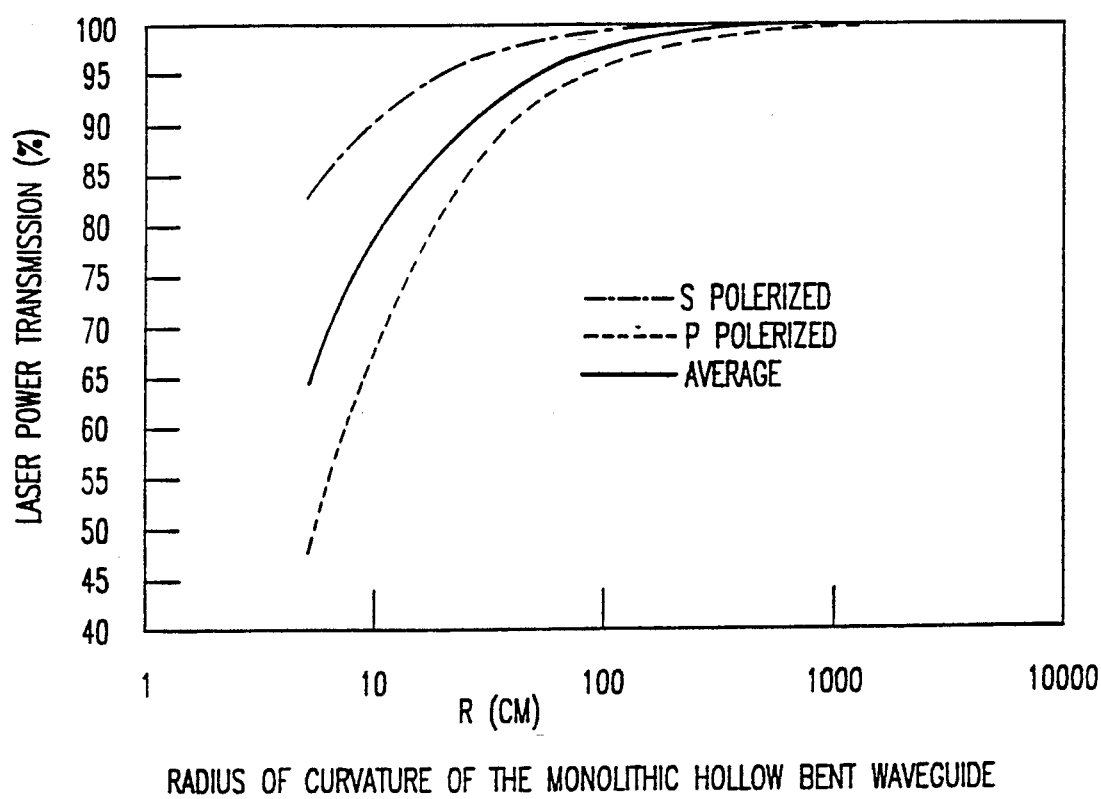
FIG. 13 is a graphic representation of a $CO_2$ laser power (10.6 $\mu m$) transmission efficiency of the radius of curvature of a monolithic hollow bent silver waveguide with a 0.85 $\mu m$ in thickness of a silver bromide film coated directly over the inner surface of 50 cm long monolithic hollow silver tube having 1 mm inside diameter.
Figure 15:
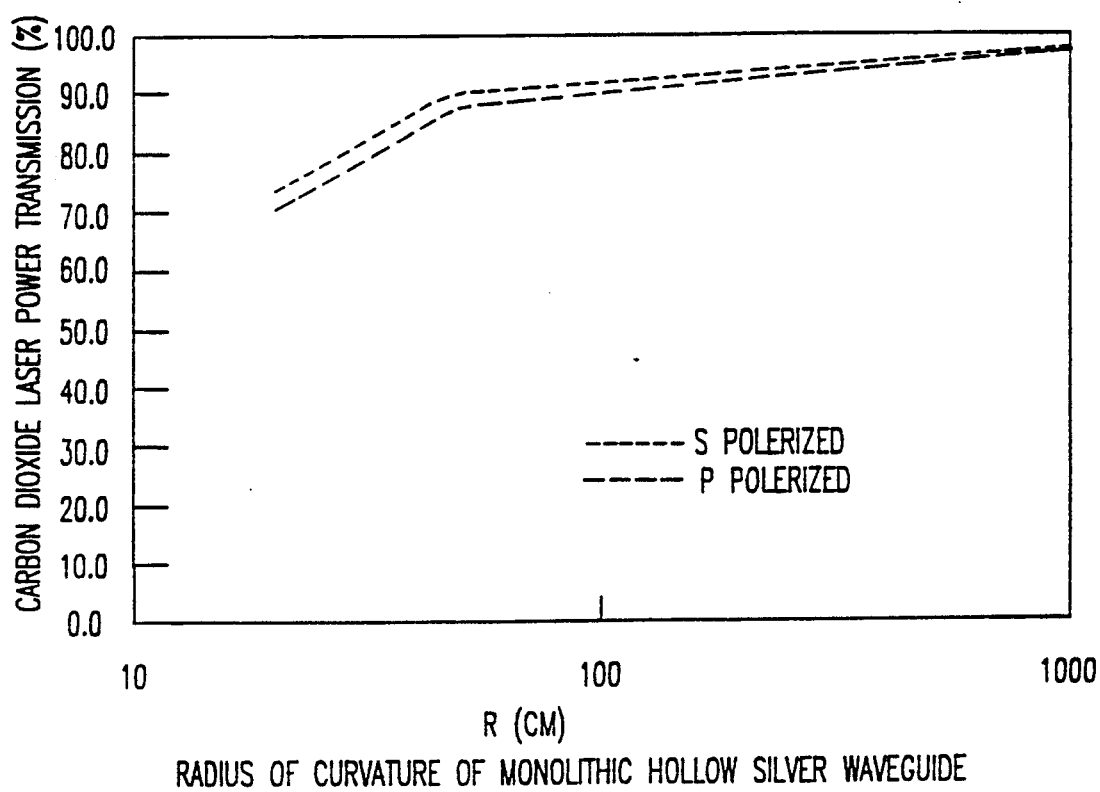
FIG. 15 is experimental results of a $CO_2$ laser power (10.6 m) transmission efficiency as a function of the radius of curvature of a monolithic hollow bent silver waveguide with about 0.8 m in thickness of AgBr film coated directly over the inner surface of a 50 cm long monolithic hollow silver tube having 1 mm inside diameter.

To demonstrate a theoretical model of laser power transmission efficiency inside a monolithic hollow bent waveguide, we consider a laser beam propagating in the direction of the guide axis and the waveguide having an optimum AgBr film thickness of about 0.85 $\mu$m coated directly over the inner surface of a half meter long monolithic hollow silver tube with an about 1 mm inside diameter. The $CO_2$ laser power transmission efficiency as a function of the radius of curvature of the monolithic hollow bent silver waveguide is shown in FIG. 13. The coupling losses, scattering losses and the Gaussian wave (electromagnetic field) propagation phenomenon are not modeled. Therefore, the experimental results on $CO_2$ laser power transmission efficiency for a practical monolithic hollow bent silver waveguide (i.e. FIG. 15) is lower than what is shown in FIG. 13.

The as received hollow silver tubes of required length are processed to obtain monolithic hollow metallic waveguides for $CO_2$ and HeNe laser transmission. The inner surface of the tubes is chemically polished to improve the inner surface finish. After an appropriate finish is achieved, a thin dielectric coating can be formed to enhance the transmission.

Figure 19:
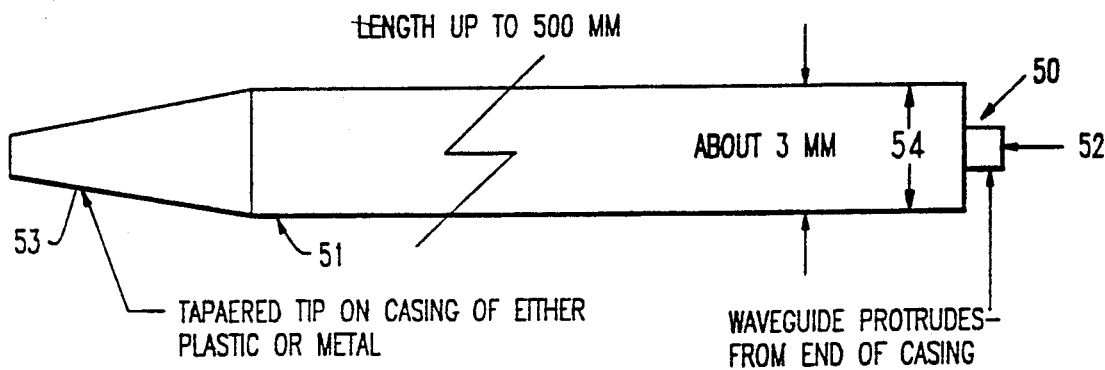
FIG. 19 is a drawing of a rigid version of the waveguide of the present invention.

One embodiment of the invention is shown in FIG. 19. The pictured waveguide 50 is encased in a jacket 51 made of either plastic or metal and couples with a device that focuses the light (not shown) into the entrance 52 of the waveguide where it extends out of the jacket 51. The jacket 51 in this embodiment has an outside diameter 54 of 3 mm and a length up to 500 mm (but not necessarily). It may also include a tapered tip 53. The waveguide of the present invention is preferably sealed in the jacket. For example, the waveguide could be slid into the jacket and bonded in place. In a flexible embodiment of the present invention, a thinner wall jacket provides the flexible properties desired, as discussed below. In particular, the wall of the jacket must be determined by the mechanical properties of the inner metal tubing, including its wall weight and the snap back properties of the plastic tubing. The wall weight is related to the thickness of the jacket walls. A heavy wall plastic tube can force a permanently bent inner metal tube to return to its original shape but may, therefore, lack sufficient flexibility. A compromise must be achieved to meet all the requirements. The plastics useful in such embodiments are Polysulfones,, such as those marketed under the tradename UDEL TM, Polyarysulfones, such as those marketed under the tradename RADEL TM, Teflon and Polyimide.

The mechanical properties of a silver tube, for example, could be as follows. It is preferred that the tubing used to form the hollow tube be hard as drawn. It is further preferred that the tube is not annealed or otherwise treated to make it soft. Ii is also preferred that the tube be capable of maintaining itself as straight as possible to minimize transmission losses. Soft tubes may accumulate many undulations from handling that might not be correctable later. In addition, it is preferred that the tube bends over its entire length and not locally. Thus, hard tempered, springy tubes are preferred in the present invention.

A waveguide made of silver is very soft and ductile. The waveguide can be drawn through a number of dies which will increase its hardness somewhat. However, it will still be relatively soft and when bent the waveguide retains the bend and does not spring back to its original shape. It is desirable to have a waveguide that is straight or bends smoothly.

The use of a plastic jacket in the present invention has produced remarkable results. A jacket made of polysulfone or polyarysulfone can force the waveguide to spring back to its original shape. The wall thicknesses of the plastic jacket and the silver tube are optimized so that the plastic jacket is the dominant tube in the system. The jacket can then straighten out any bends and can ensure that any bend is smooth and gradual. The waveguide will thus maintain its flexibility. Optimally the monolithic hollow tube that makes up the waveguide will have a wall thickness of less than about 0.3 mm and the jacket for a flexible waveguide will have an optimum wall thickness of less than about 0.8 mm. A thicker, heavier wall plastic jacket can be used to make a rigid waveguide, optimally its wall thickness may be about 1 mm.

The present invention uses the stiff properties of the plastic jacket to control the type of bending that occurs in the waveguide. The present invention distributes the bends over the entire length of the waveguide and reverses any permanent bends. A plastic with a strong desire to retain its shape, such as RADEL TM Polysulfone or UDEL TM Polyarysulfone, is best for this invention.

The following examples are based on the use of a silver tube as the monolithic hollow tube.

EXAMPLE 1 POLISHING SOLUTION PREPARATION AND TESTING

The chemical polishing solution was prepared by dissolving 65 gms of $CrO_3$ in 100 ml of DI $H_2O$ and adding 5 ml HCl forming a mixed acid solution. This solution was diluted 10 times before using. If more concentrated solution is desired, the stock solution can be diluted only 2-3 times with DI water.

The diluted solution should be tested before usage. This was done by taking 10 ml of freshly prepared solution in a small beaker. A piece was cut from the silver tube to be polished and immersed in the polishing solution, and left in for 30 seconds. The piece was removed from the solution and rinsed with DI water. A white, silver chloride film formed on the surface. This film was and should be removed completely from the surface either by, i) dropping the piece in a beaker having DI water and placing the beaker in an ultrasonic device; or ii) preparing a solution of 50% $NH_4OH$ in DI water, dipping the piece into the solution and holding it while gently moving it in the solution.

The film should dissolve completely leaving a visibly polished surface. This turns the DI water white.

Any discoloration of the silver surface indicates that the solution has to be readjusted. The hydrochloric acid concentration is crucial as the reactions are too slow in solutions that are too weak. However, an overly strong concentrated hydrochloric acid solution forms black film on the silver which cannot be removed completely and leaves the silver surface discolored, and it is preferred that such blackened tubes are not used in the waveguide of the present invention.

EXAMPLE 2 SET UP THE POLISHING AND CLEANING APPARATUS

Before setting up the apparatus, all the glassware and fittings should be cleaned with methanol and DI water. Preferred embodiments of the apparatus for cleaning and polishing are set up as shown in FIGS. 14(a-f).

Figure 14A:
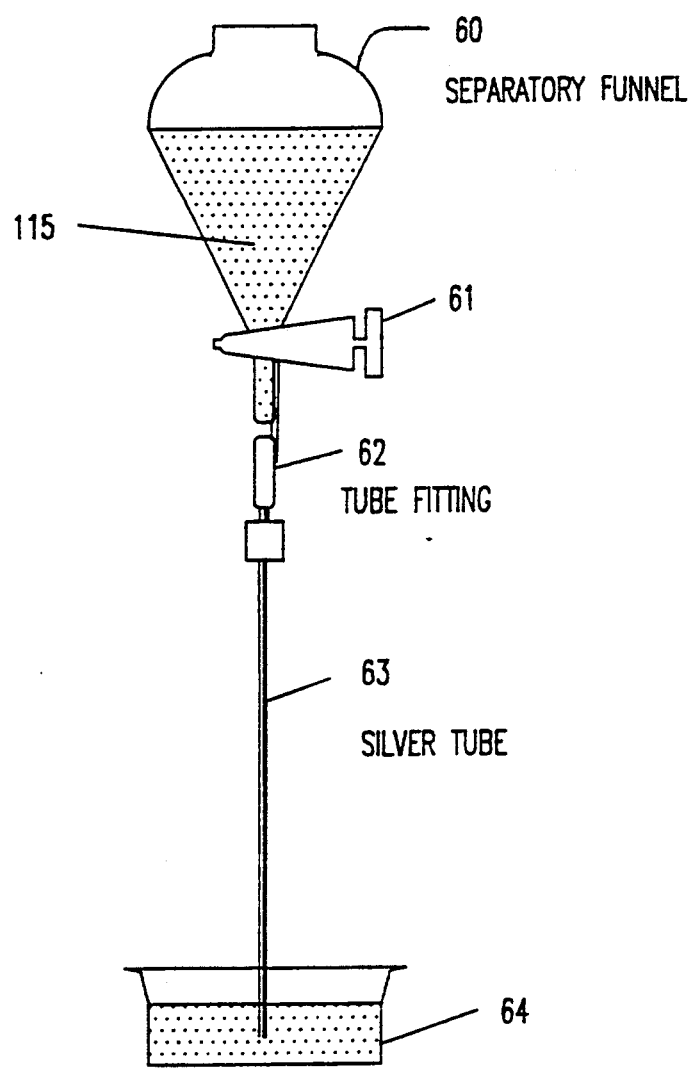
FIG. 14a. is a diagrammatic representation of one form of the apparatus for running the polishing solution through the silver tube.

1) Apparatus for running the polishing solution through the silver tube is shown in FIG. 14a. Referring to FIG. 14a, a separatory funnel 60 was connected through a valve 61 to one end of a tube fitting 62. The monolithic hollow tube 63 was attached to the other end of the tube fitting 62. A beaker was placed under the silver tube 63 to catch the polishing solution as it runs through the tube 63.

Figure 14B:
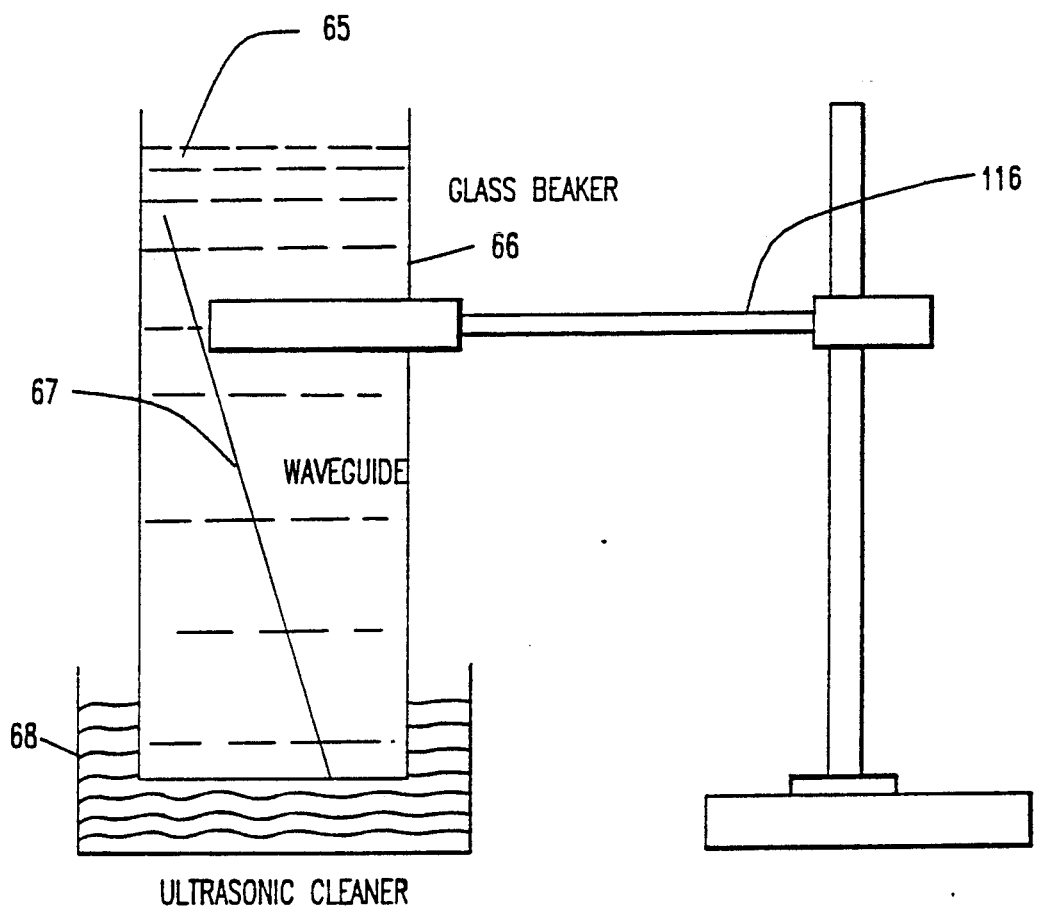
FIG. 14b. is a diagrammatic representation of one form of the apparatus for ultrasonic cleaning in DI water.

2) Apparatus for ultrasonic cleaning in DI water is shown in FIG. 14b. Referring to FIG. 14b, a glass beaker 66 that was large enough to hold the waveguide 67 completely immersed in deionized water 65 was held in an ultrasonic cleaner 68 by a support 116, such as a ring stand.

Figure 14C:
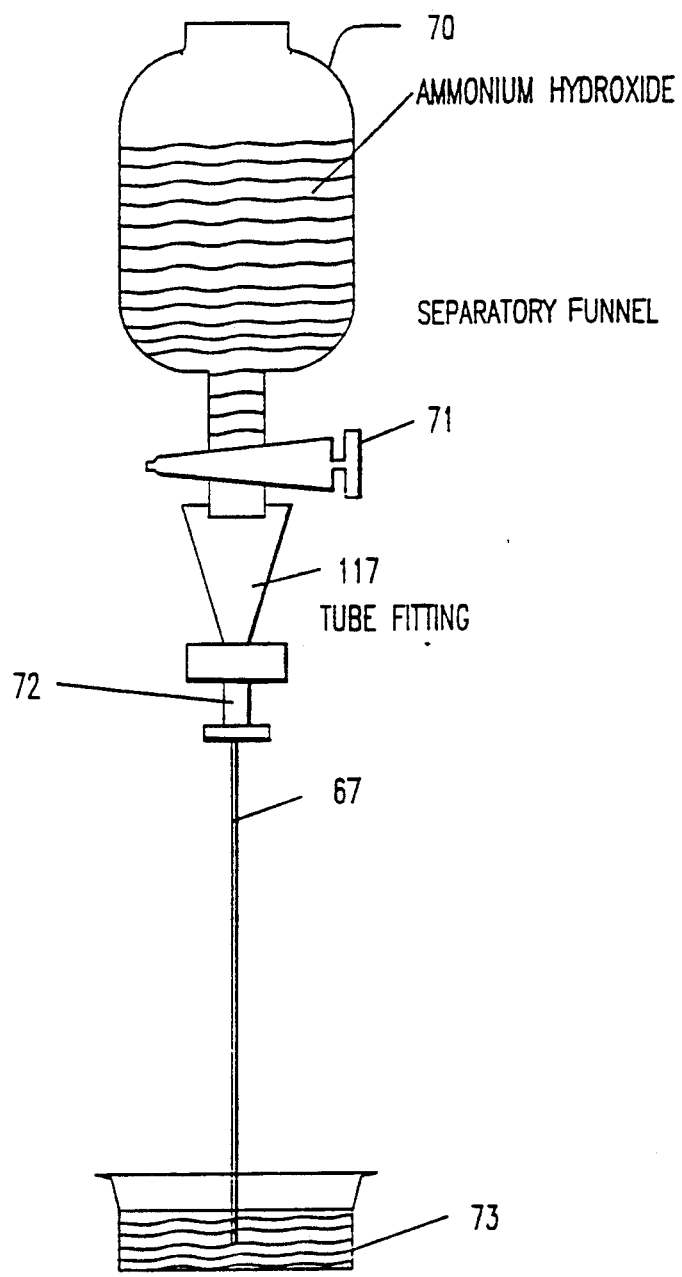
FIG. 14c. is a diagrammatic representation of one form of the apparatus for running 50% ammonium hydroxide through the tube.

3) Apparatus for running 50% ammonium hydroxide through the tube is shown in FIG. 14c. Referring to FIG. 14c, a separatory funnel 70 filled with ammonium hydroxide 69 was connected through two valves 71, 117 to a tube fitting 72. The waveguide 67 was connected to the tube fitting 72. A beaker 73 or other similar container was used to catch the ammonium hydroxide that had run through the waveguide.

Figure 14D:
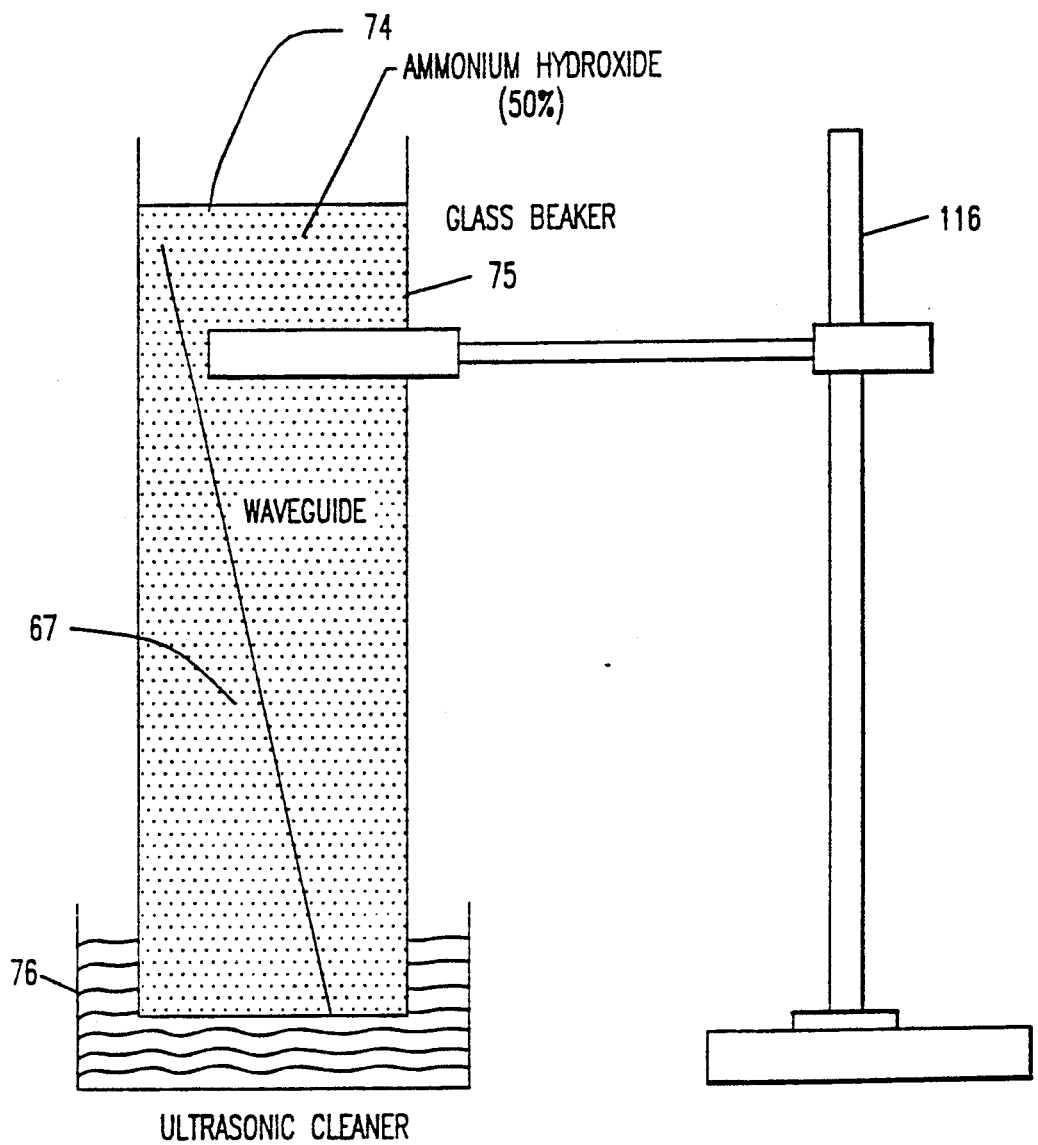
FIG. 14d. is a diagrammatic representation of one form of the apparatus ultrasonic cleaning in 50% ammonium hydroxide.

4) Apparatus for ultrasonic cleaning in 50% ammonium hydroxide is shown in FIG. 14d. Referring to FIG. 14d, a glass beaker 75 large enough to hold a waveguide 67 completely immersed in ammonium hydroxide was held in an ultrasonic cleaner 76 by a support, such as a ring stand 118.

Figure 14E:
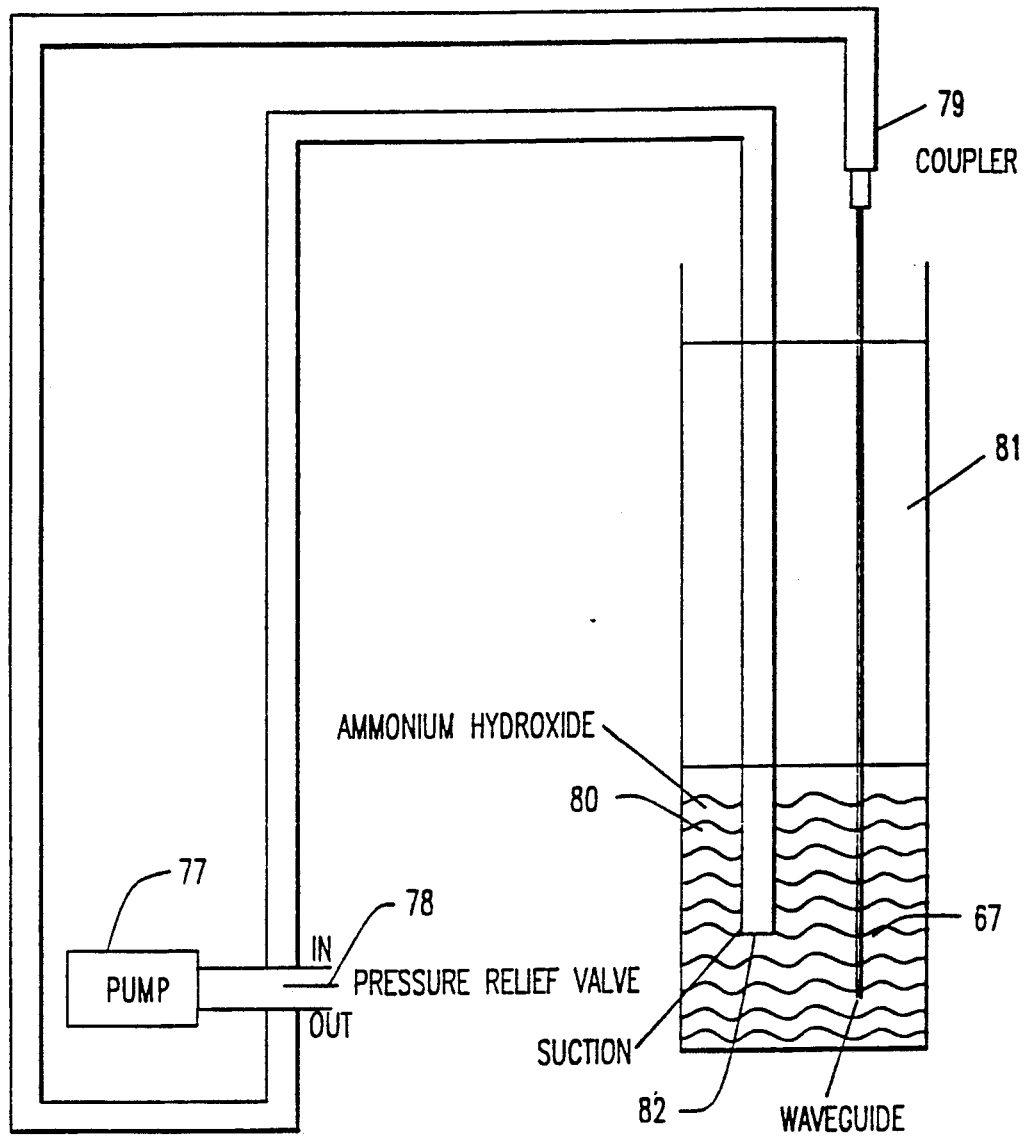
FIG. 14e. is a diagrammatic representation of one form of the alternative to the apparatus of FIG. 1c & FIG. 1d for pumping 50% ammonium hydroxide through the tube.

5) An alternative to the apparatus for running 50% ammonium hydroxide through the tube, as shown in FIG. 14c, is apparatus for pumping 50% ammonium hydroxide through the tube, as shown in FIG. 14e. Referring to FIG. 14e, a pump having an inlet and an outlet 77 was connected to a pressure relief valve 78. The outlet of the pump was connected to a coupler 79 that held the waveguide 67 in a beaker filled with ammonium hydroxide. The inlet to the pump was used as a suction 82 for drawing the ammonium hydroxide back through the pump.

Figure 14F:
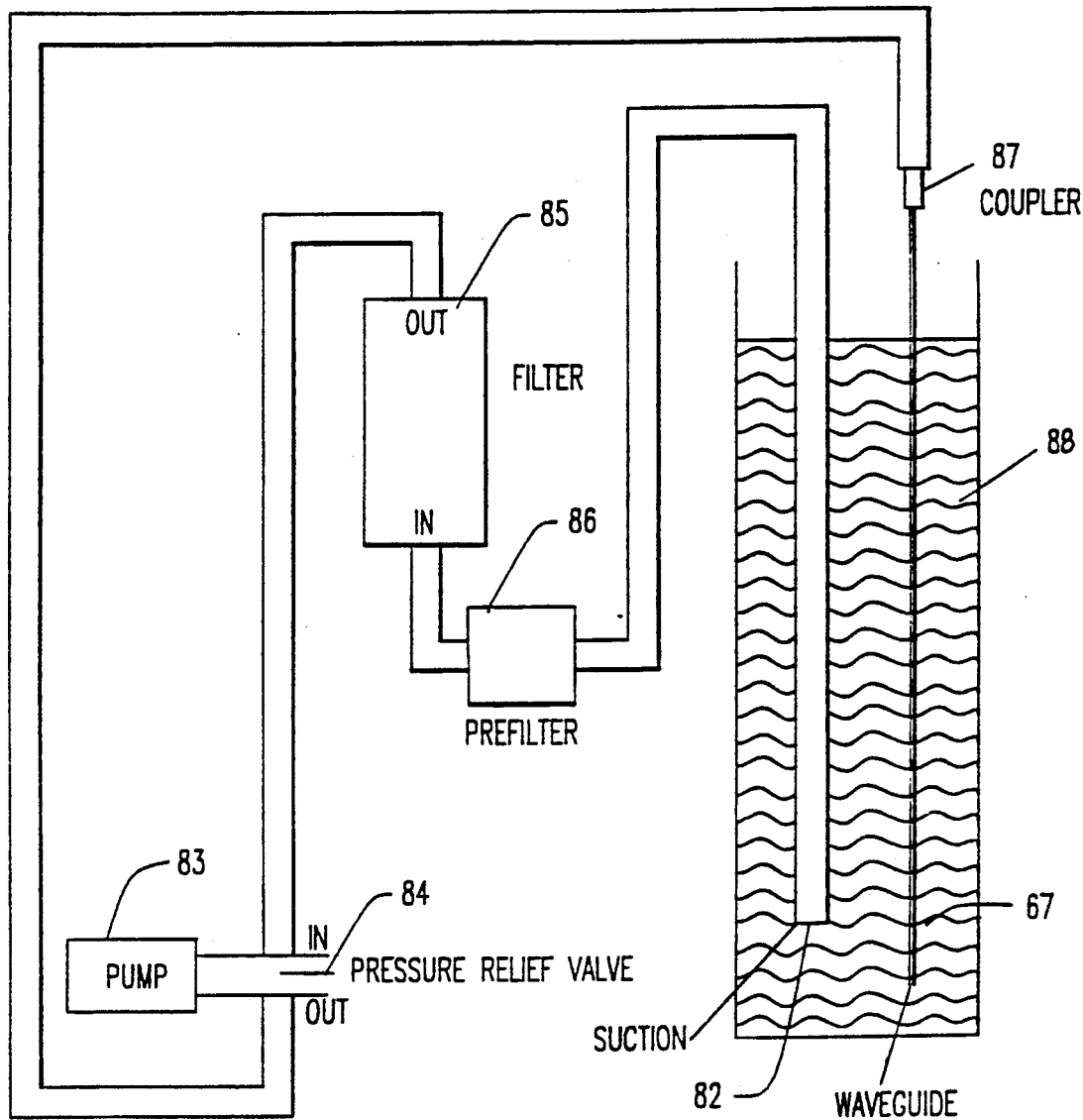
FIG. 14f. is a diagrammatic representation of one form of the apparatus for pumping DI water through the tube.

6) Apparatus for pumping DI water through the tube is shown in FIG. 14f. Referring to FIG. 14f, a pump 83 was connected to a pressure relief valve 84. The inlet of the pump was connected to the outlet of a DI water filter 85. The inlet of the DI water filter 85 was connected to the outlet of a prefilter 86. The inlet of the prefilter 86 extended into a beaker 88 filled with DI water. The DI water was drawn up through the filters 86, 85 to the pump 83. The outlet of pump 83 was connected to a coupler 87 that held the waveguide in the beaker 88 so that the DI water could be pumped through.

EXAMPLE 3 POLISHING AND CLEANING PROCEDURE FOR SILVER TUBE

1) The polishing mixed acid solution and the ammonium hydroxide solution were prepared. The apparatus as shown in FIGS. 14(a-f) were set up.

2) The as-received silver tube was rinsed with methanol and DI water.

3) Place the tube in an ultrasonic cleaning apparatus with sufficient $NH_4OH$ to completely cover the tube for 10 minutes to remove oxide or any other film that may have formed during fabrication. This step utilizes the apparatus shown in FIG. 14d.

4) Remove the tube and rinse it with DI water using, for example, the apparatus shown in FIG. 14f.

5) Fill the separatory funnel, 60 in FIG. 14a, with about 125 ml of the polishing solution and then connect the tube to be polished to the funnel.

6) Let the polishing solution run through the tube for a maximum of 5 minutes. The polishing process is self limiting as the tube will clog with reaction product, i.e., AgCl. The typical reaction time is about 5 minutes for tubes with a 1 mm inside diameter.

7) Remove the tube and rinse with DI water. Place the tube in ultrasonic cleaning apparatus for DI water, as shown in FIG. 14b for about 30 minutes to remove most of the reaction product. Make sure to pull the tube up a couple of times in the beginning to remove the slurry from inside and to avoid clogging the tube.

8) Remove the tube and connect it to the apparatus for running 50% $NH_4OH$ through the tubes, as shown in FIG. 14c. Let the alkaline solution run for 5 minutes.

9) Remove the tube and place it in the ultrasonic cleaning apparatus in 50% $NH_4OH$, as shown in FIG. 14d. Leave the tube in for 15 minutes.

10) (Steps 10 and 11 are alternatives to steps 8 and 9) Place the tube in apparatus for pumping 50% $NH_4OH$ through the tubes, as shown in FIG. 14e, for 10 minutes.

11) . Remove the tube and rinse with DI water. Place it in apparatus for pumping DI water through the tube, as shown in FIG. 14f, for 10 minutes.

12) Remove the tube and let it dry for 30 minutes. During the last 5-10 minutes, the tube can be heated with a heatgun while drying.

13) Steps 5-11 can be repeated if longer polishing times are required. Optimum time of polishing can be determined for a particular batch of tubes and then all tubes can be polished for that time. The polishing time can vary from 30 seconds to 30 minutes.

The tube is now ready for further processing. Quality control at this point can be implemented by measuring HeNe laser transmission.

EXAMPLE 4 THE POLISHING AND CLEANING PROCEDURE FOR SILVER ALLOY TUBES

For polishing and cleaning silver-copper alloy tubes, the composition of polishing stock solutions are 80 ml $H_2SO+20$ ml $HNO_3$ (etching solution) and 55 gm $CrO_3+1$ ml HCl+200 ml $H_2O$ (polishing solution). These are diluted 10 times before use. The solution of $H_2SO_4:HNO_3=4:1$ etched the copper from the silver surface and then a subsequent polish using the silver polishing solution of 55 grm $CrO_3$:1 ml HCL:200 ml $H_2O$ was done to improve the inner surface finish such silver-copper alloy tube. A similar polishing method can be used to improve the interior surface smoothness for other silver alloy tubes and the solutions for etching and polishing can used in alternating polishing cycles.

EXAMPLE 5 PROCEDURE TO FORM SILVER HALIDE FILMS BY BROMINE AND IODINE LIQUID PHASE REACTIONS

Figure 16:
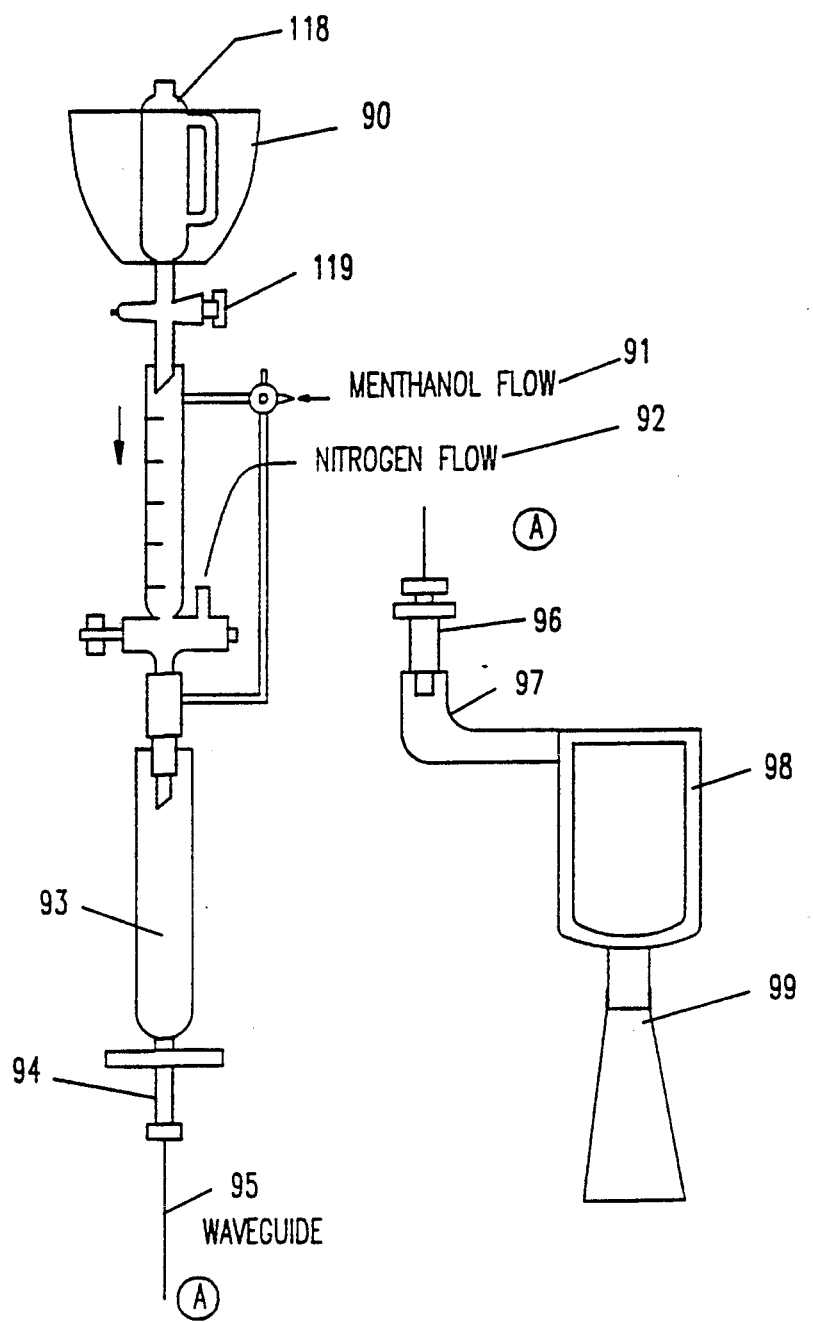
FIG. 16 is a diagrammatic representation of one form of the apparatus to form silver halide films by bromine and iodine liquid phase reactions in accordance with the present invention.

The apparatus to form silver halide films by bromine and iodine liquid phase reactions are shown in FIG. 16. Referring to FIG. 16, a separatory funnel 118 was placed in a cooling bath funnel 90. The separatory funnel was connected to a valve 119 that controls the flow of bromine or iodine into the silver tube 95. Between the separatory funnel and the silver tube there was a valve for controlling the flow of methanol 91 and nitrogen 92. These valves 91, 92 were connected to an adaptor 93 and then to a tube fitting 94 attached to one end of the silver tube 95. The other end of the silver tube was connected to a universal adaptor 96 which in turn was connected to a bent adaptor 97. The bent adaptor was connected to a dewer condenser 98 which emptied the run off from the silver tube into a collection flask 99.

The chemical reaction procedure comprises the steps of:

1. All the glassware was rinsed with methanol and dried. All joints were sealed with parafilm or PTFE shrink wrapping to prevent contamination.

2. Ice can be and was added to a cooling bath or condenser funnel to reduce the temperature of liquid bromine or liquid iodine before entering the silver tube.

3. Bromine or iodine liquid was added to the cooling bath funnel. A measured amount of liquid bromine or iodine was allowed to run through the tube and collected at the end.

4. The bromine or iodine valve was closed and collection flask was replaced.

5. The methanol valve was opened and the of any residual bromine or iodine in the tube.

6. The tube was removed and rinsed with methanol and dried by purging it with nitrogen for approximately 15 minutes.

7. All traces of bromine or iodine were removed from the apparatus before processing the next tube.

EXAMPLE 6 PROCEDURE TO FORM SILVER HALIDE FILMS BY CHLORINE GAS PHASE REACTION

Figure 17:
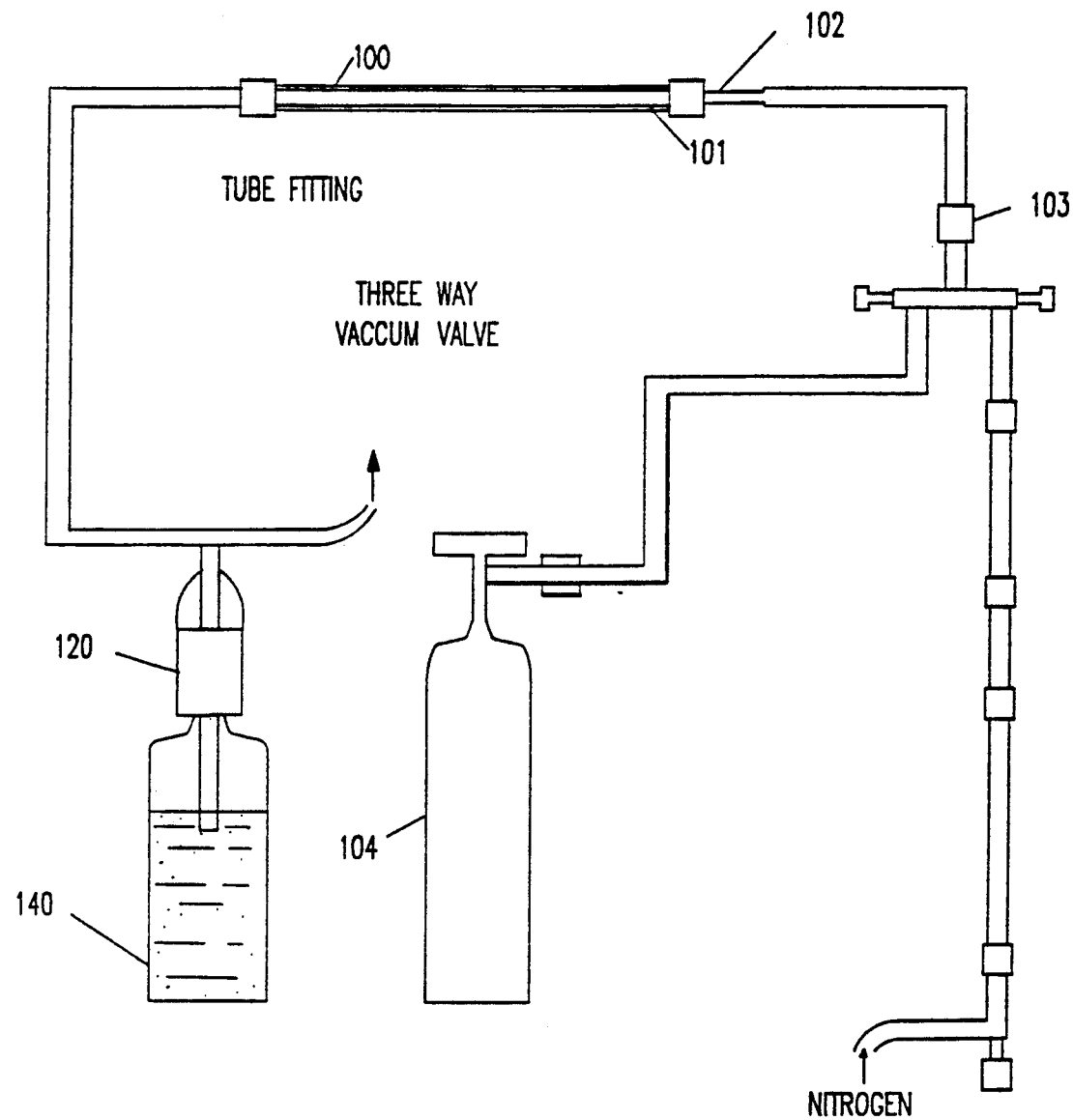
FIG. 17 is a diagrammatic representation of one form of the apparatus to form silver halide films chlorine gas phase reactions in accordance with the present invention.

The apparatus to form silver halide films by chlorine gas phase reactions are shown in FIG. 17. Referring to FIG. 17, a glass tube 100 was used to support the silver tube 101. One end of the silver tube 101 was connected to a gas washing bottle 120 filled with saturated aqueous alkali 140 for collecting and neutralizing the used gas. The other end of the silver tube 101 was connected to a tube fitting 102. A chlorine gas tank 104 was connected to the silver tube 101 through the tube fitting via a three way vacuum valve 103 used to switch between chlorine and nitrogen. A source for nitrogen (not shown) was also connected to the three way valve 103.

The chemical reaction procedure comprises the steps of:

1. All the glassware was rinsed with methanol and dried.

2. The set up was purged with nitrogen.

3. The silver tube was connected to the fitting 102, as shown in FIG. 17.

4. The silver tube was purged with nitrogen for about 15 minutes.

5. The three way valve was operated to allow chlorine gas to go through the silver tube, as shown in FIG. 17.

6. After a specified reaction time of up to three hours, the three way valve was operated to purge the silver tube with nitrogen for about 15 minutes.

EXAMPLE 7 PROCEDURE TO FORM SILVER HALIDE FILMS BY IODINE AND BROMINE VAPOR PHASE REACTIONS

Figure 18:
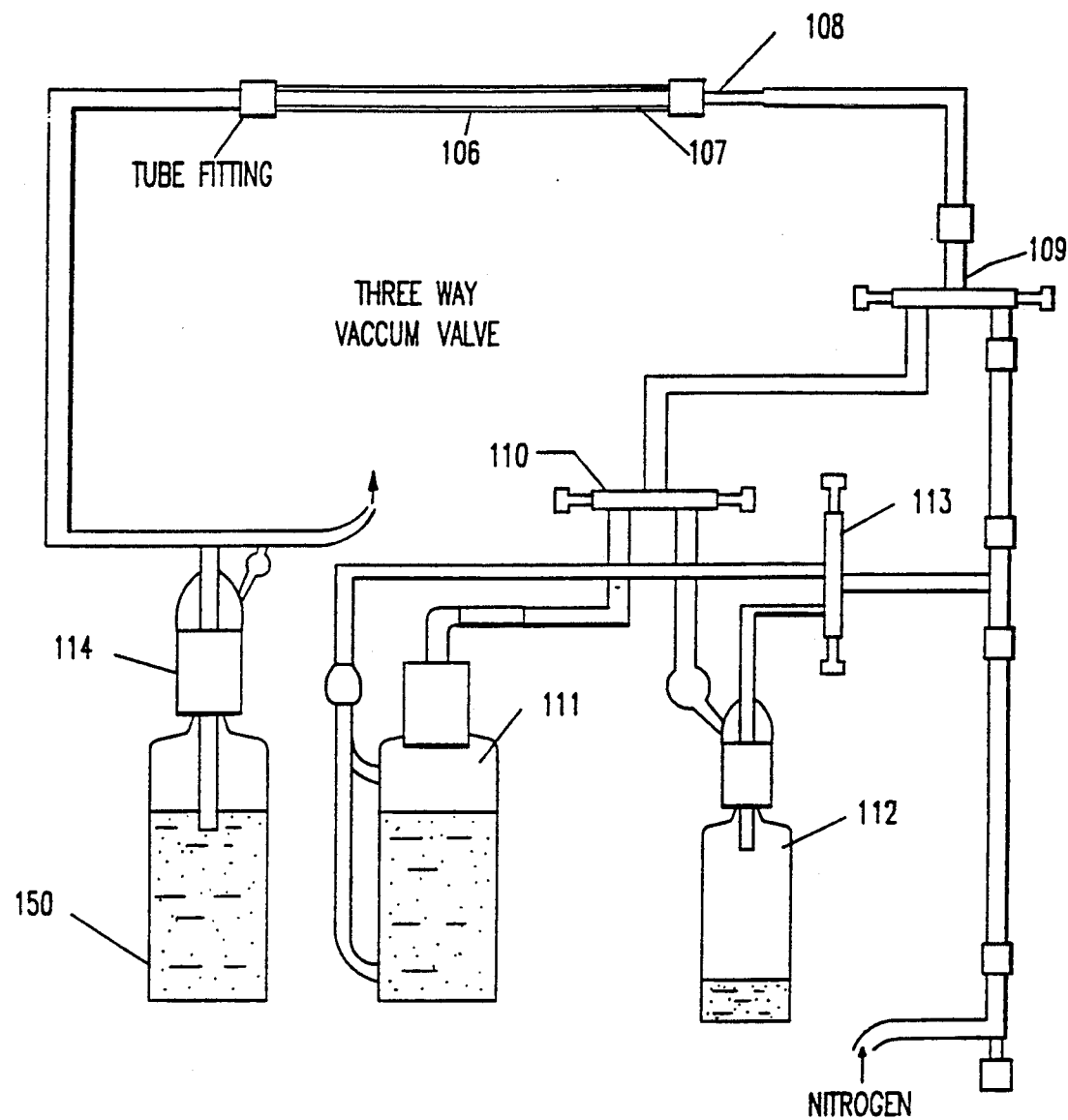
FIG. 18 is a diagrammatic representation of one form of the apparatus to form silver halide films by iodine and bromine vapor phase reactions in accordance with the present invention.

The apparatus to form silver halide films by iodine and bromine vapor phase reactions is shown in FIG. 18. Referring to FIG. 18, a glass tube 106 was used to support the silver tube 107. One end of the silver tube 107 was connected to a gas washing bottle 114 filled with saturated aqueous alkali 150 for collecting and neutralizing the waste gas. The other end of the silver tube 107 was connected to a tube fitting 108 which is connected to one port of a first three way vacuum valve 109. Another port of the valve 109 was connected to a second three way vacuum valve 110, one port of which was connected to an iodine bottle 111 and the other port was connected to a bromine bottle 112. The last port of the first valve 109 was connected to a source for nitrogen (not shown). The iodine and bromine bottles 111, 112 were connected to a third three way vacuum valve 113 whose third port was also connected to the source for nitrogen.

The chemical reaction procedure comprises the steps of:

1. All the glassware was rinsed with methanol
2. The set up was purged with nitrogen.
3. The silver tube was connected to the fitting 108, as shown in FIG. 18.
4. The silver tube was purged with nitrogen for about 15 minutes.
5. Bromine liquid and iodine crystals were placed in their respective bottles.
6. Depending on required treatment, the valves for either iodine or bromine vapor were opened. The flow rate of nitrogen for treatment with iodine vapor is 2 scfh and for bromine vapor is 1 scfh.
7. After a specified reaction time of up to three hours, the valves were closed and the silver tube was then purged with nitrogen for about 15 minutes.

What is claimed is:

1. A monolithic hollow waveguide for transmitting electromagnetic radiation, comprising:
   a monolithic hollow tube having an interior surface, and
   a dielectric film coating formed directly on said interior surface of said monolithic hollow tube, up to about 20 microns in thickness, said film having a complex index of refractivity with the real part, $n_1$, between about 0.5 and about 4.5 and an imaginary part, $k_1$, substantially equal to zero and having material of said monolithic hollow tube as a component of the coating.

2. The monolithic hollow waveguide of claim 1, wherein said film is selected from the group consisting of metal halide and metal oxide films.

3. The monolithic hollow waveguide of claim 1, wherein said monolithic hollow tube has a complex index of refractivity with a real part, $n_2$, greater than about 2.0 and an imaginary part, $k_2$, less than approximately 85.

4. The monolithic hollow waveguide of claim 3, wherein said monolithic hollow tube is as drawn, temper hard monolithic hollow metal tube encased within a jacket.

5. A surgical device comprising the monolithic waveguide of claim 4.

6. A power delivery device comprising the monolithic waveguide of claim 4.

7. A monolithic hollow waveguide according to claim 1, wherein said monolithic tube comprises silver.

8. A monolithic hollow waveguide according to claim 1, wherein said monolithic hollow tube but not said film consists of at least about 99% silver.

9. A monolithic hollow waveguide according to claim 1, wherein said monolithic hollow tube has a circular or rectangular interior cross-section.

10. A monolithic hollow waveguide according to claim 1, wherein said monolithic hollow tube has an interior diameter of less than about 5 millimeters.

11. A monolithic hollow waveguide according to claim 1, wherein said monolithic hollow tube has an interior diameter of about 1 millimeter.

12. A dielectric-coated monolithic metal waveguide for transmitting electromagnetic radiation, comprising;
   (a) a solid substrate, monolithic hollow metal tube with an interior having a polished and cleaned mirror like surface; and
   (b) a thin native dielectric film of up to about 20 microns in thickness formed directly on the interior surface of the tube, said film having a complex index of refractivity with a real part, $n_1$, less than about 4.5 and an imaginary part, $k_1$, about equal to zero and having material of said tube as a component of the film.

13. The monolithic hollow waveguide of claim 12, wherein said metal is selected from the group consisting of silver, aluminum, gold, barium, chromium, copper, molybdenum, nickel, tin, tungsten, lead, zinc, iron and their alloys.

14. The monolithic hollow metal waveguide of claim 12, wherein said native dielectric film having a complex index of refractivity with a real part $n_1$ less than about 4.5 and an imaginary part $k_1$ about equal to zero is selected from the group consisting of metal halide and metal oxide films.

15. The monolithic hollow metal waveguide of claim 12, wherein said monolithic hollow tube is a rigid monolithic hollow metal tube for making a rigid monolithic hollow waveguide.

16. The monolithic hollow metal waveguide of claim 12, wherein said monolithic hollow tube is a flexible monolithic hollow metal tube for making a flexible monolithic hollow waveguide.

17. The monolithic hollow metal waveguide of claim 12, which further comprises a jacket to encase said monolithic hollow tube.

18. The monolithic hollow waveguide of claim 17, wherein said jacket consists of plastic or metal and said waveguide further comprises a means for coupling said waveguide to a means for focussing light into the entrance of the waveguide.

19. The monolithic hollow waveguide of claim 18, wherein said waveguide can be used in an endoscope sheath.

20. The monolithic hollow metal waveguide of claim 17, wherein said jacket is capable of flexing and able to force said hollow tube to retain its shape.

21. The monolithic hollow waveguide of claim 18, wherein said plastic is chosen from the group consisting of polysulfones, polyarysulfones, Teflon or polyimides.

22. A waveguide according to claim 12, wherein said monolithic hollow metal tube has a circular or rectangular cross-section.

23. A waveguide according to claim 12, wherein said hollow tube has an inside diameter of less than about 5 millimeters and a wall thickness of less than about 2 millimeters.

24. A waveguide according to claim 12, wherein said monolithic metal hollow tube comprises silver.

25. A waveguide according to claim 12, wherein said monolithic metal hollow tube but not said film consists of at least about 99% silver.

26. A waveguide according to claim 25, wherein said silver hollow tube further comprises aluminum, copper, gold, lead, iron, molybdenum, nickel and combinations thereof.

27. The monolithic hollow silver waveguide of claim 26, wherein the silver tube has an inside diameter of less than about 5 millimeters and a wall thickness of less than about 2 millimeters.

28. A waveguide according to claim 12, wherein said dielectric film comprises at least one member of the group consisting of silver halide, silver oxide, copper halide, copper oxide, and combinations thereof.

29. The waveguide according to claim 12, wherein said film is isotropic and non-birefringent.

* * * * *